Sept. 1, 1953  J. MARCO  2,650,804
MACHINE AND PROCESS FOR PRODUCING
LATEX FOAM CONTINUOUSLY
Filed Sept. 13, 1950  20 Sheets-Sheet 11
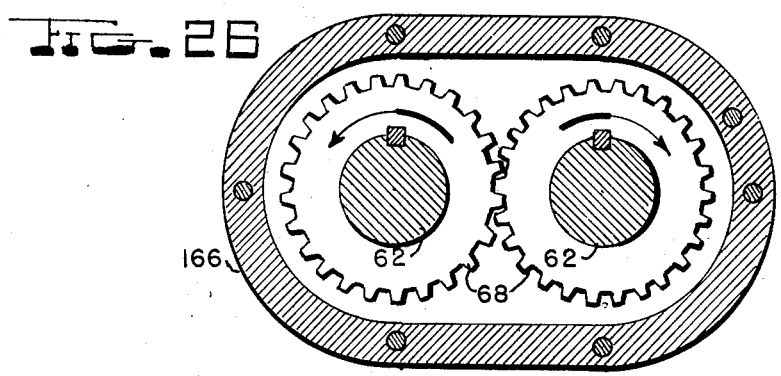
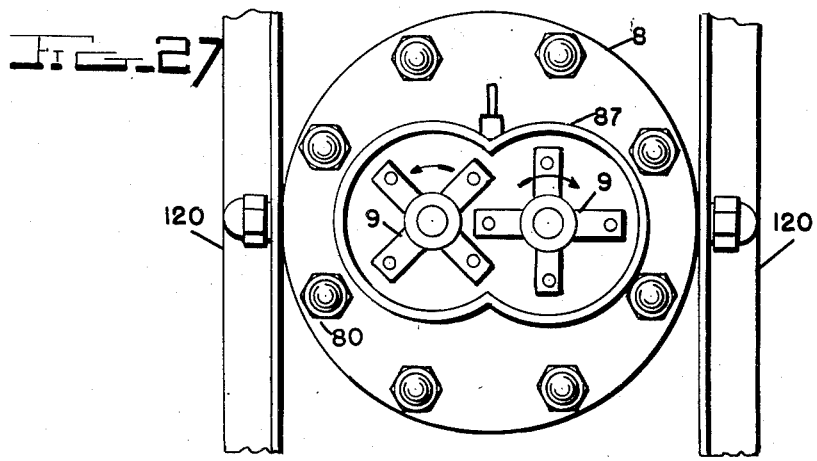
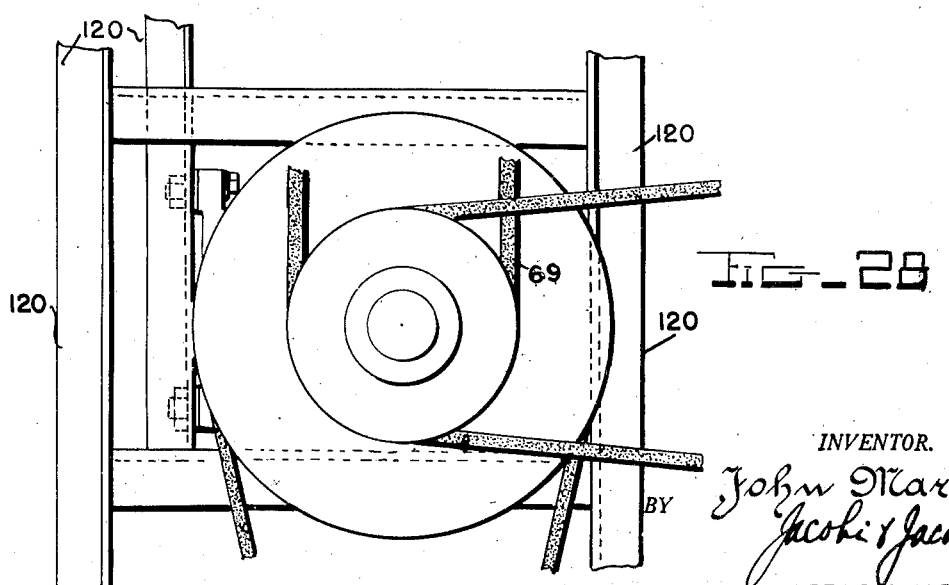
INVENTOR.
John Marco
BY Jacobi & Jacobi
ATTORNEYS

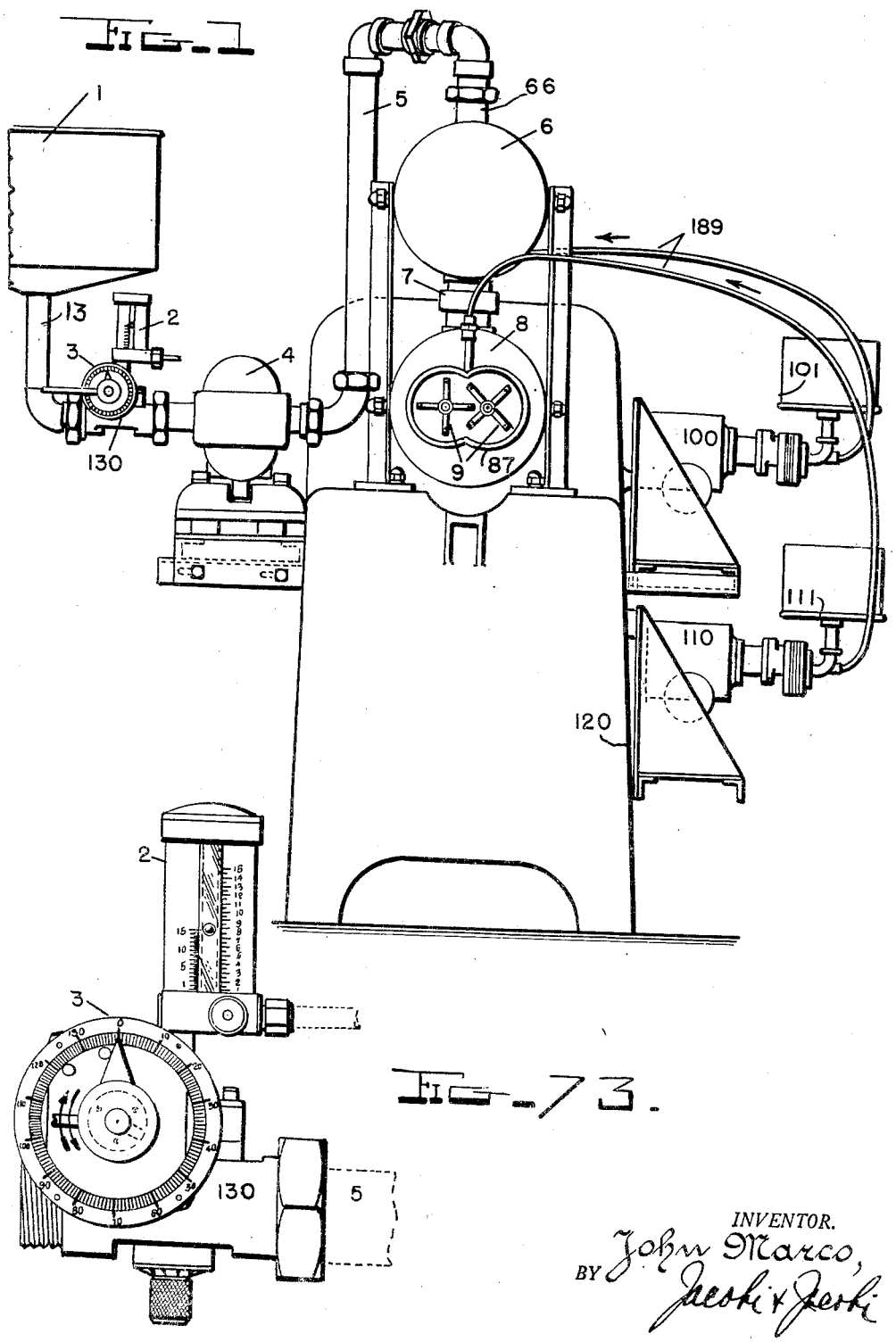

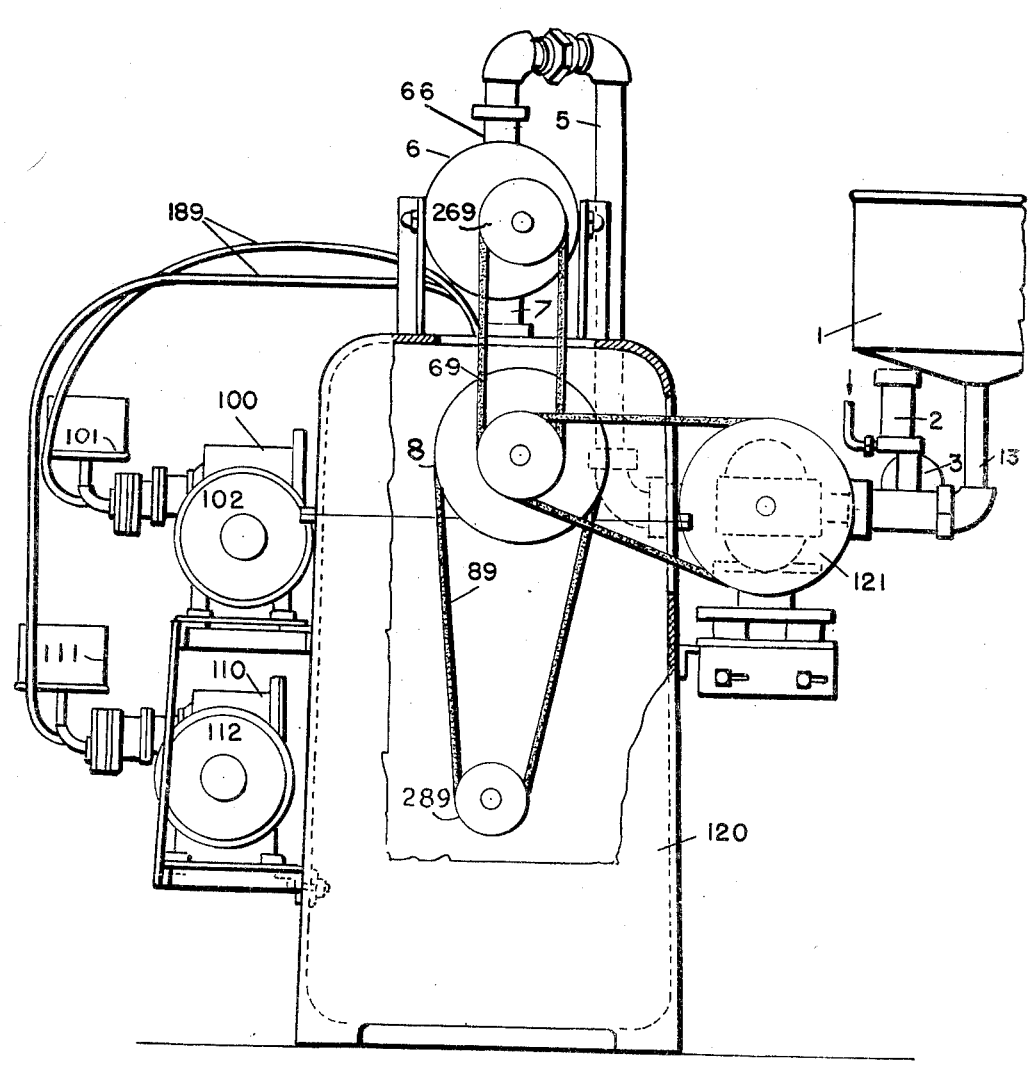

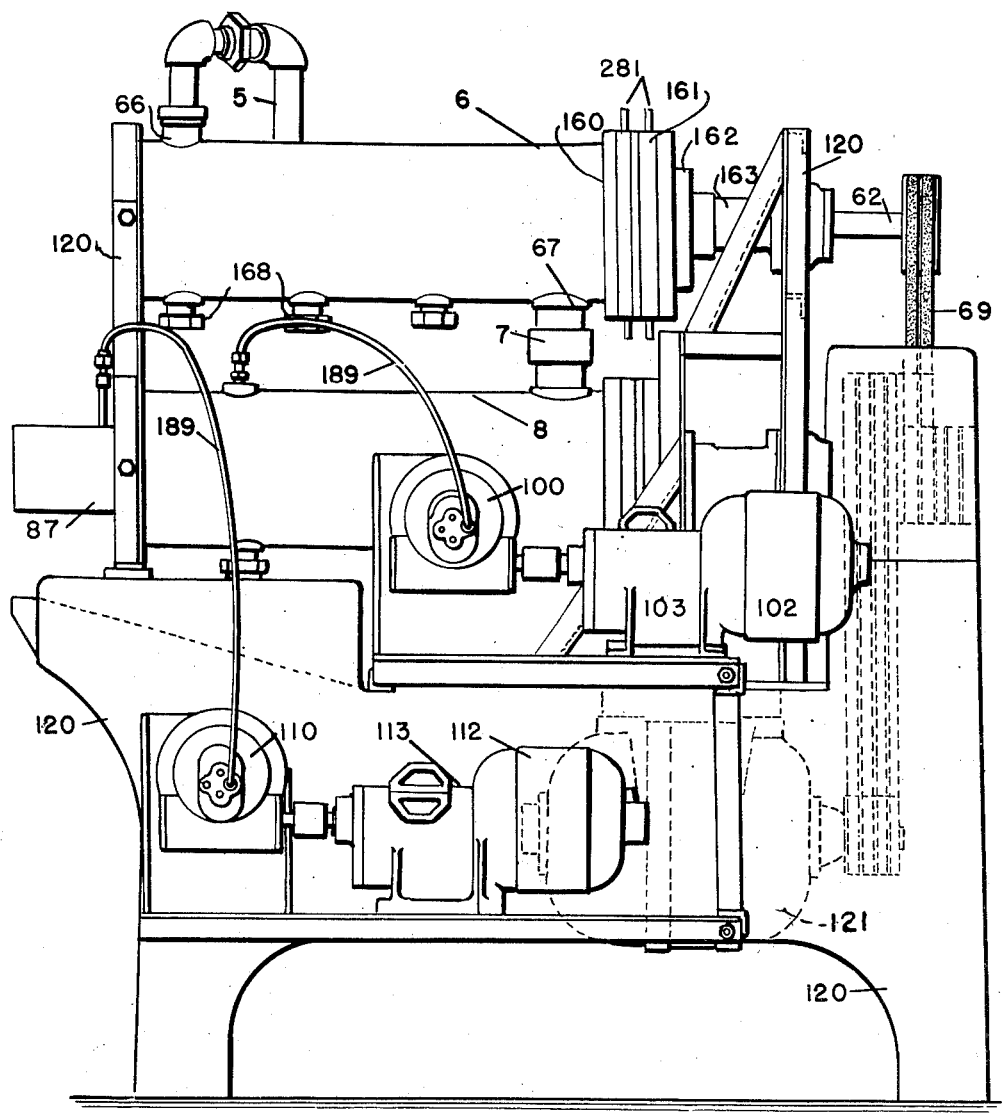

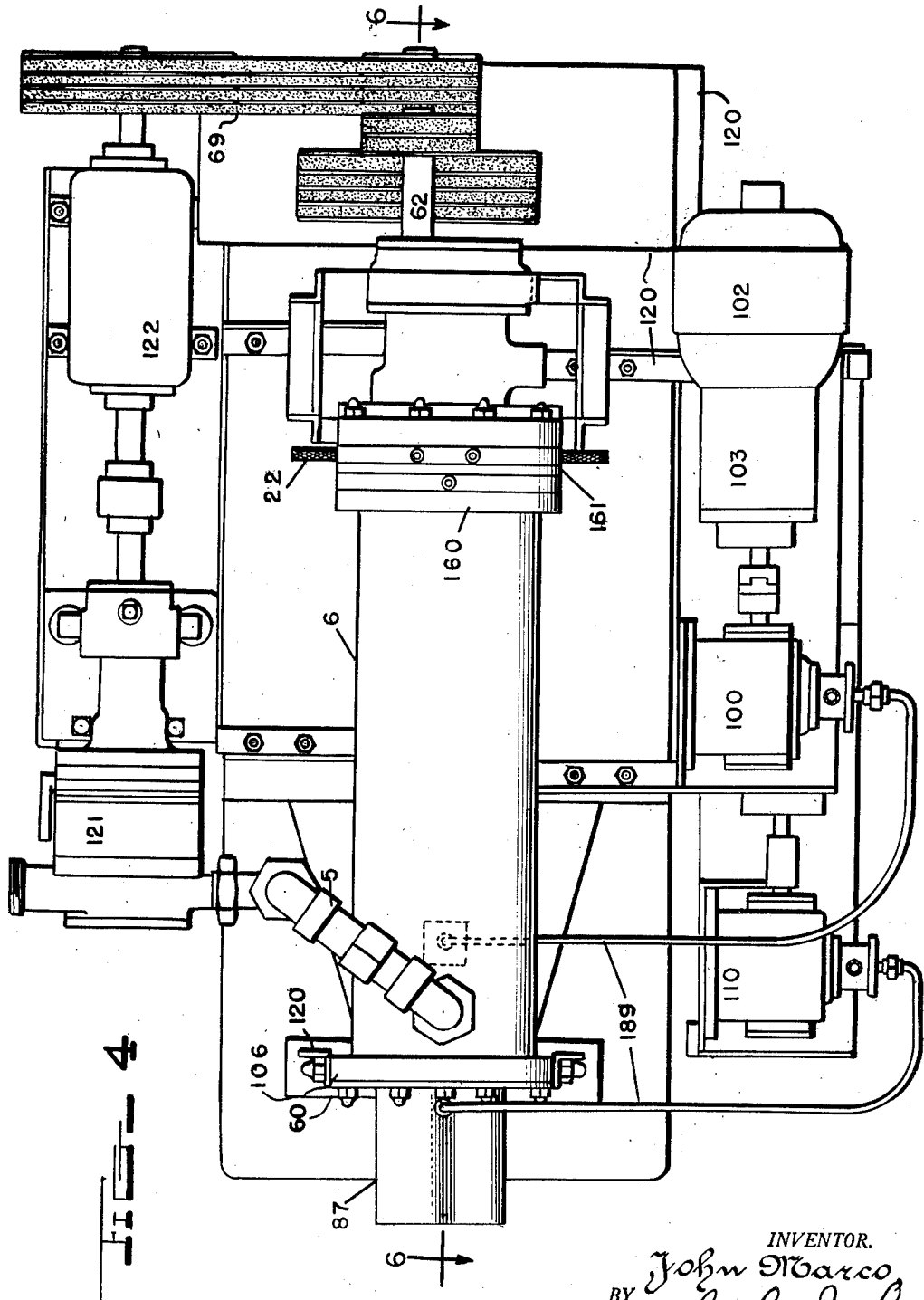

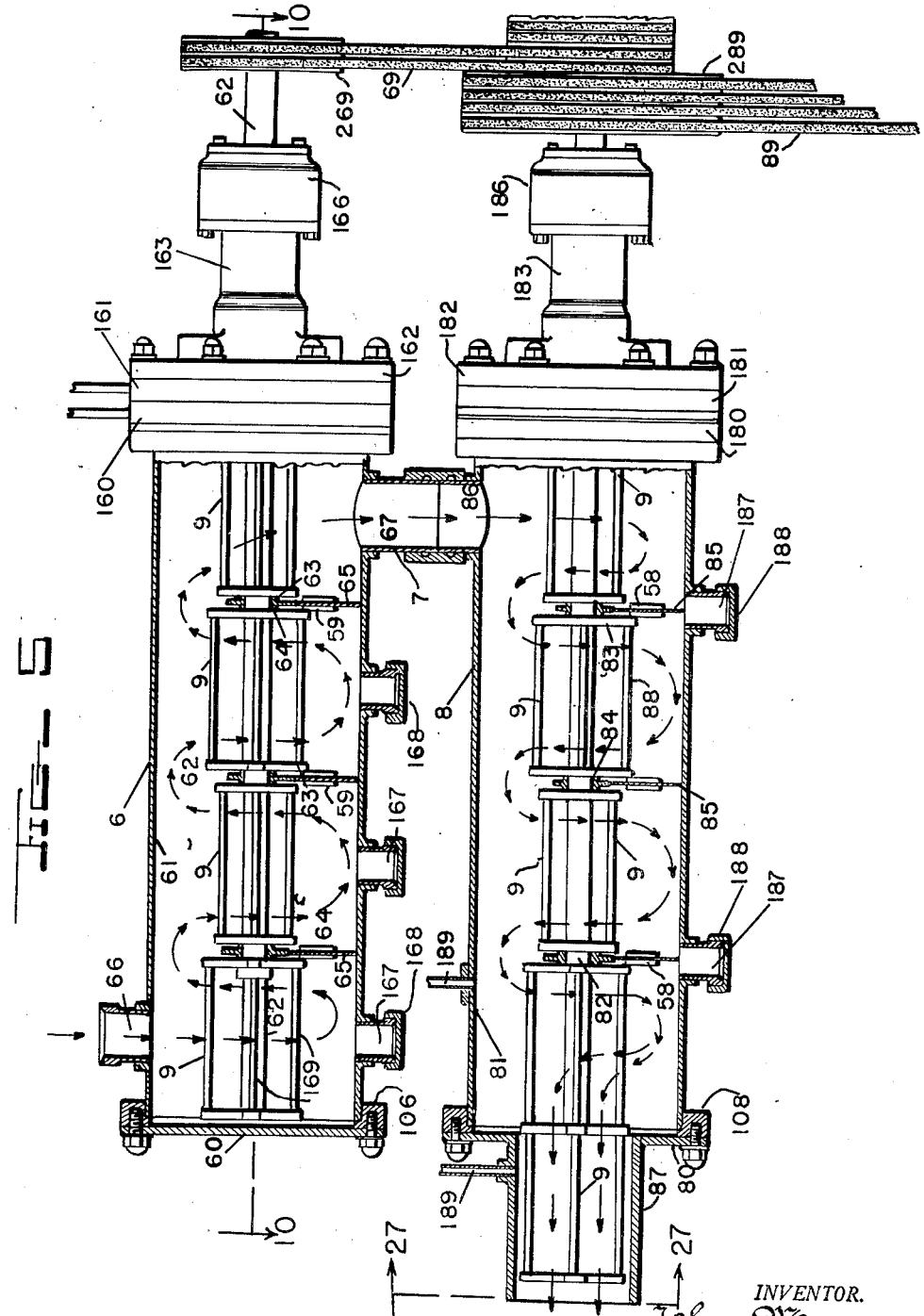

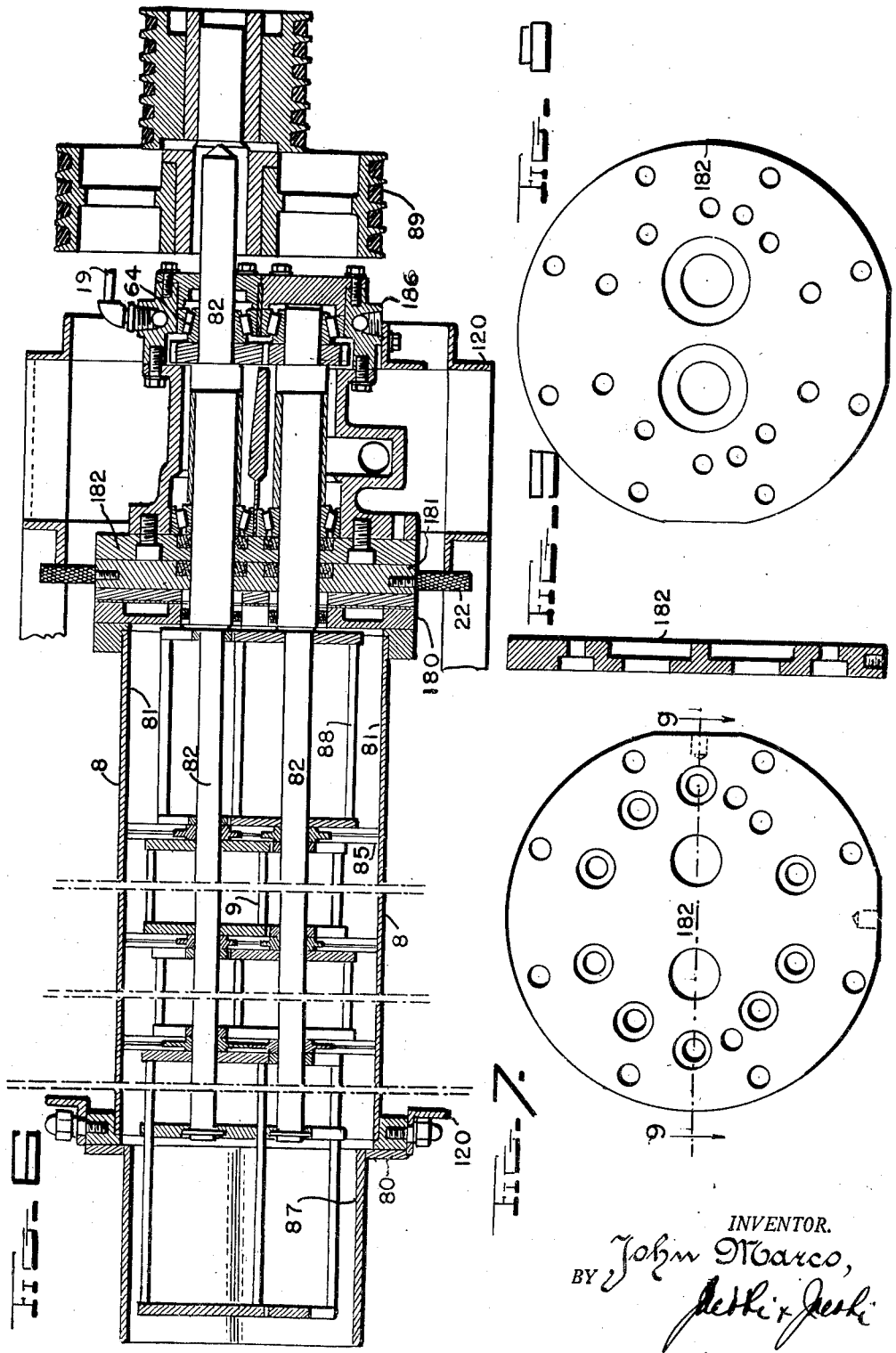

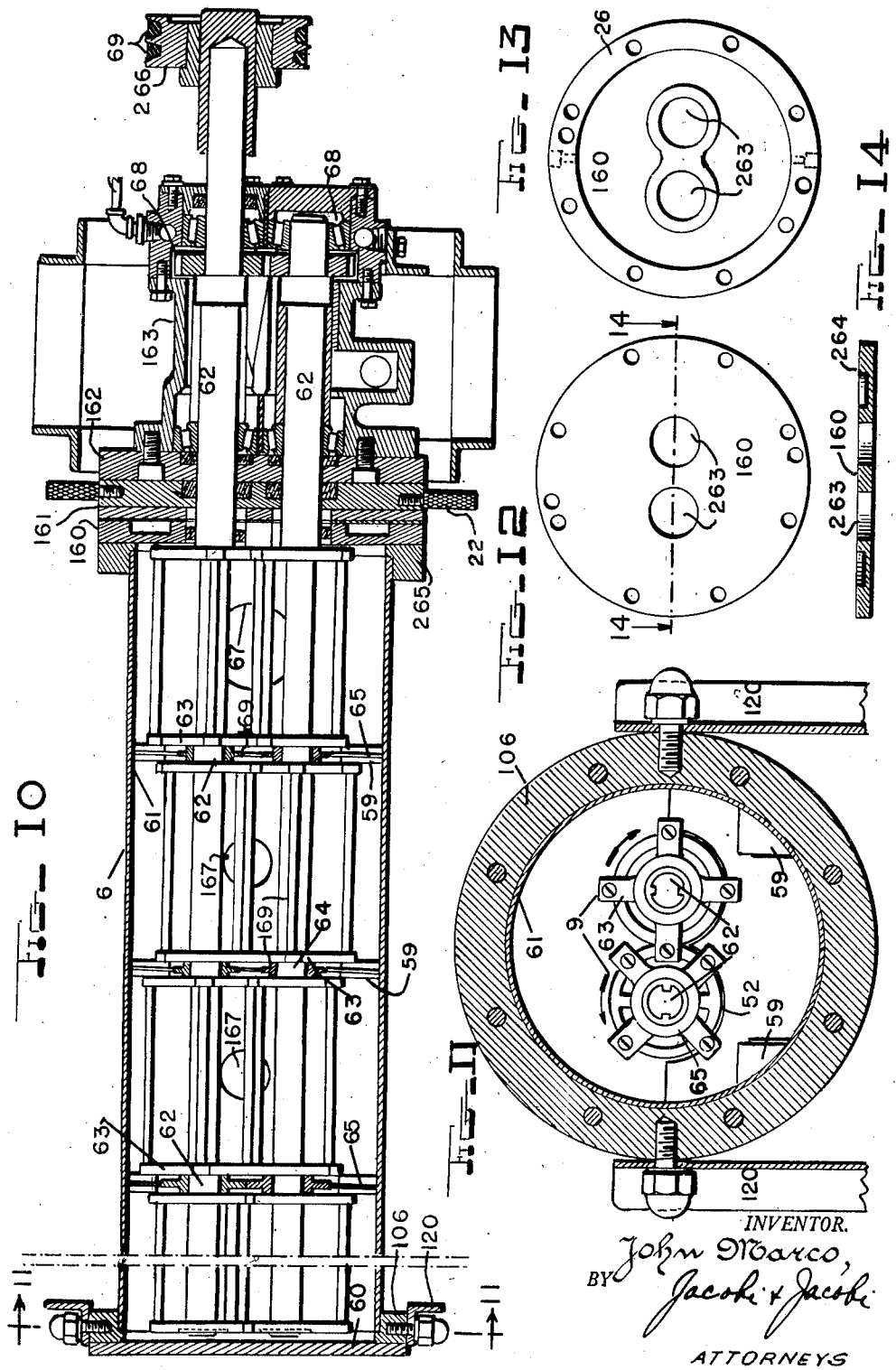

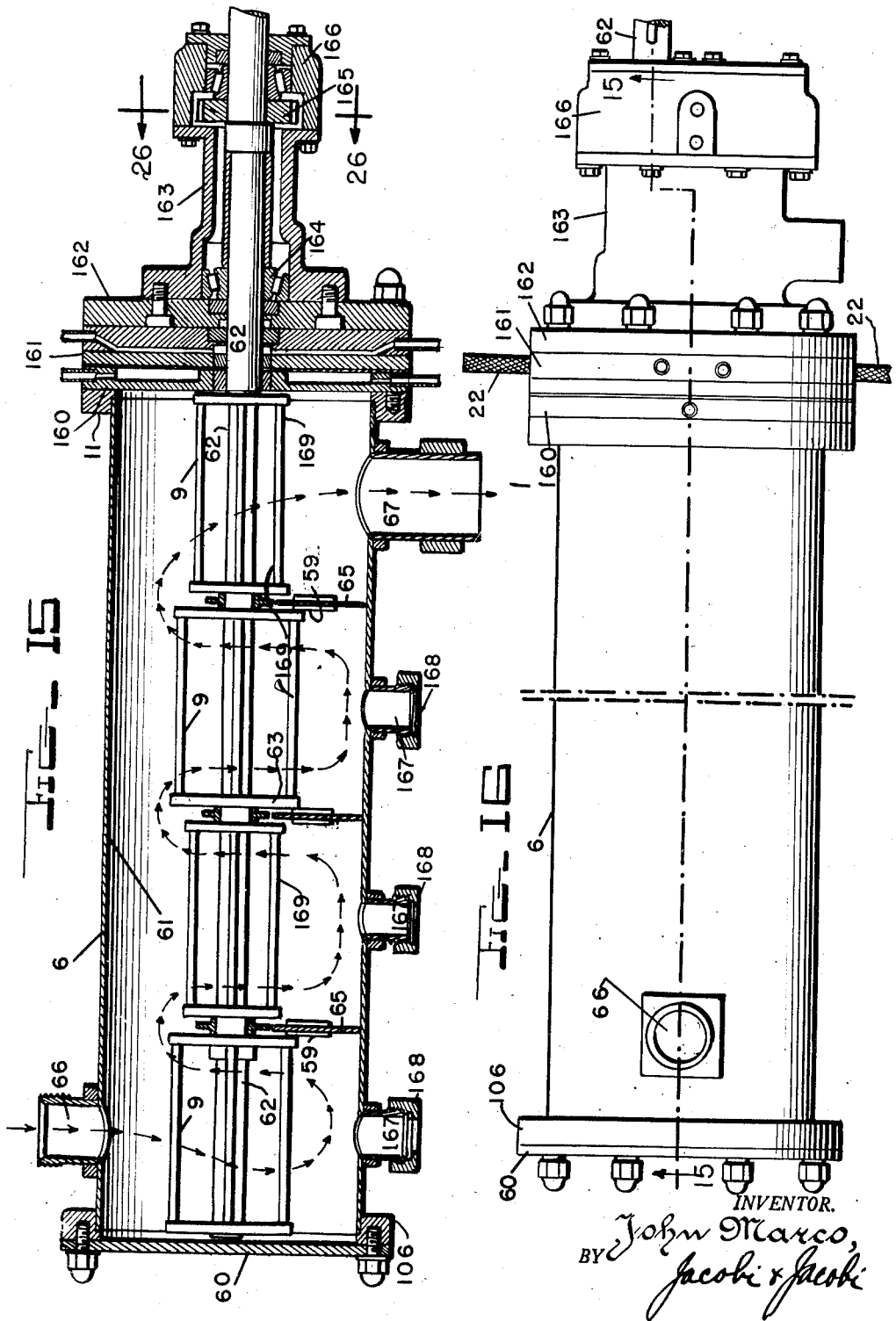

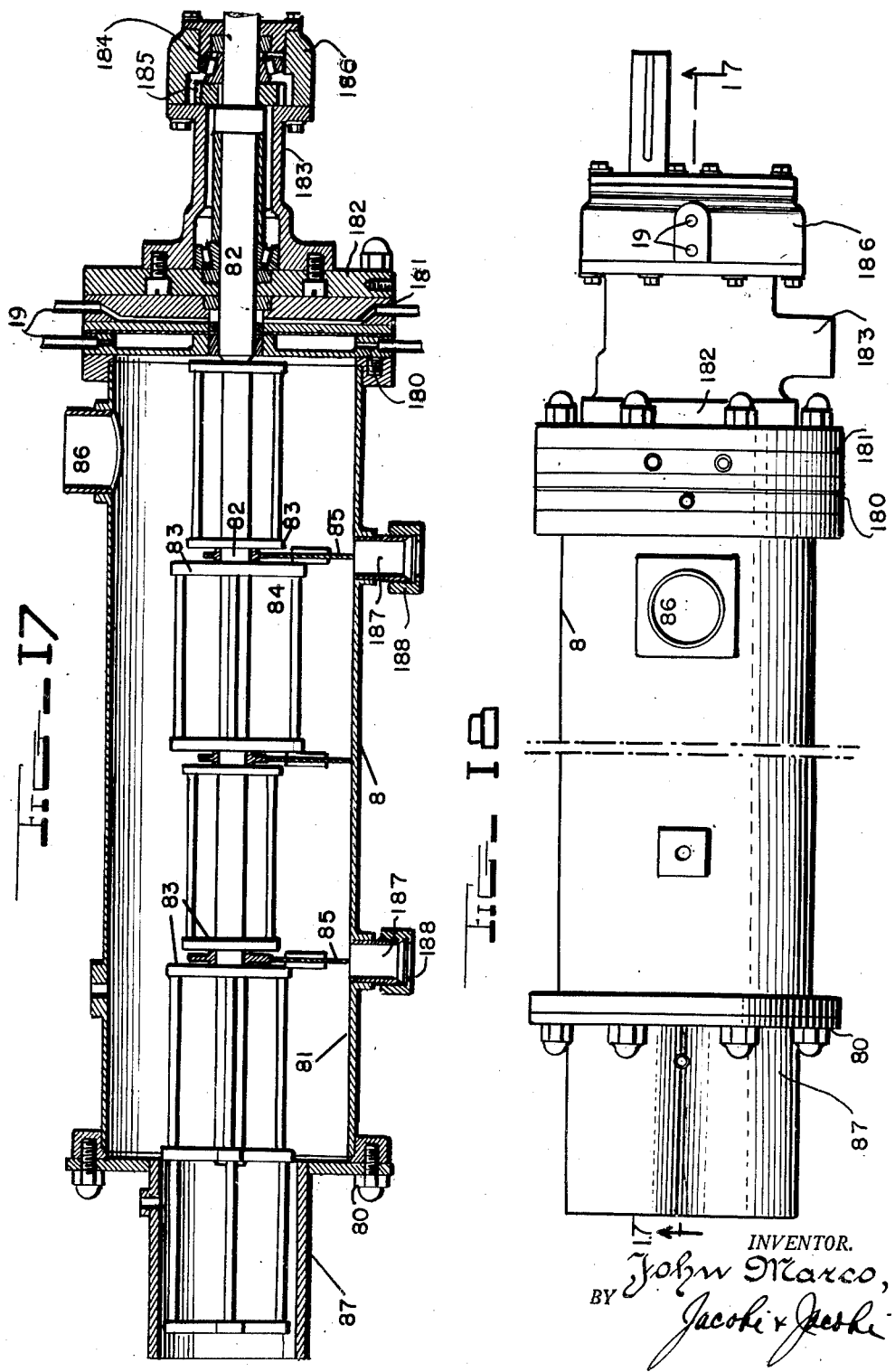

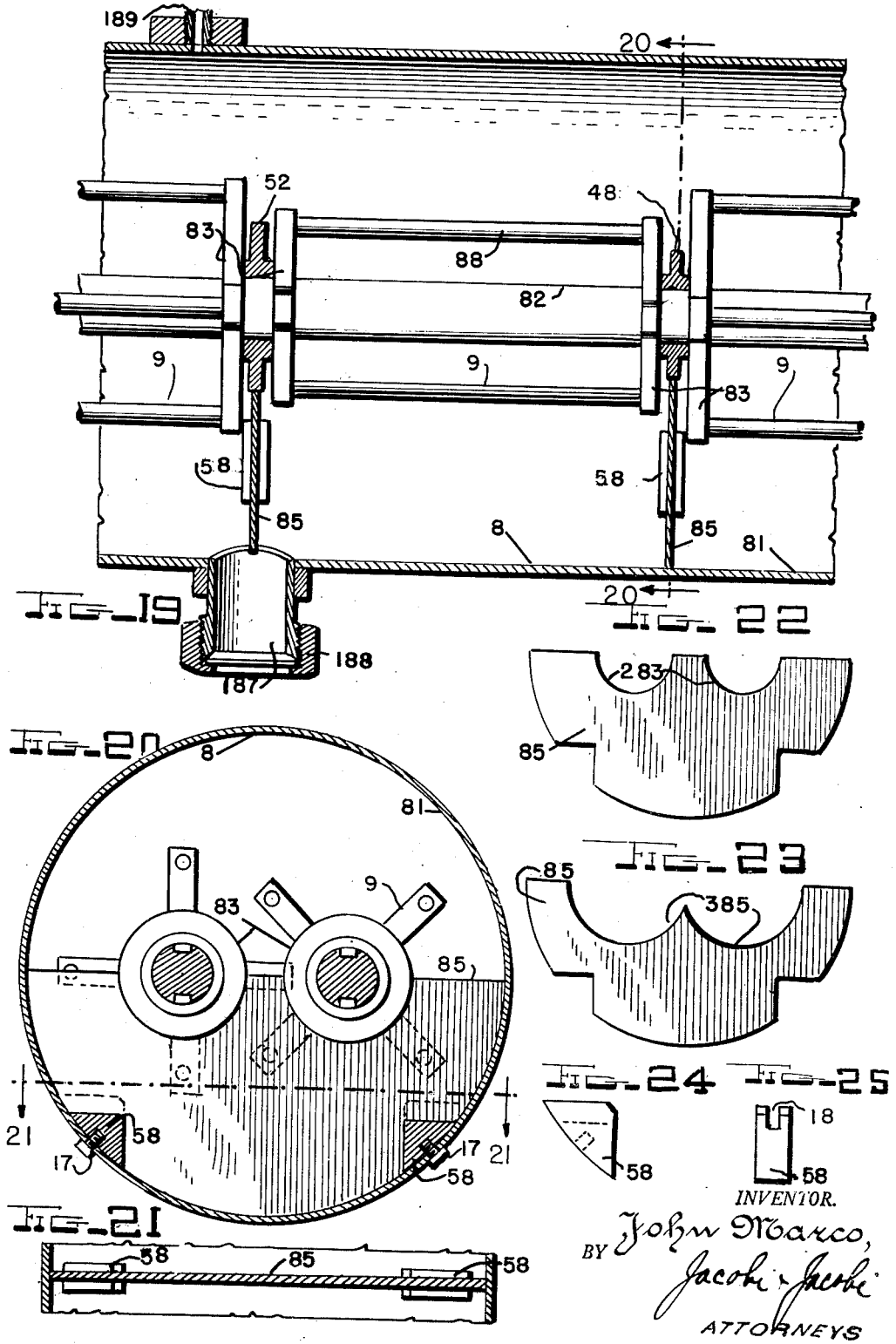

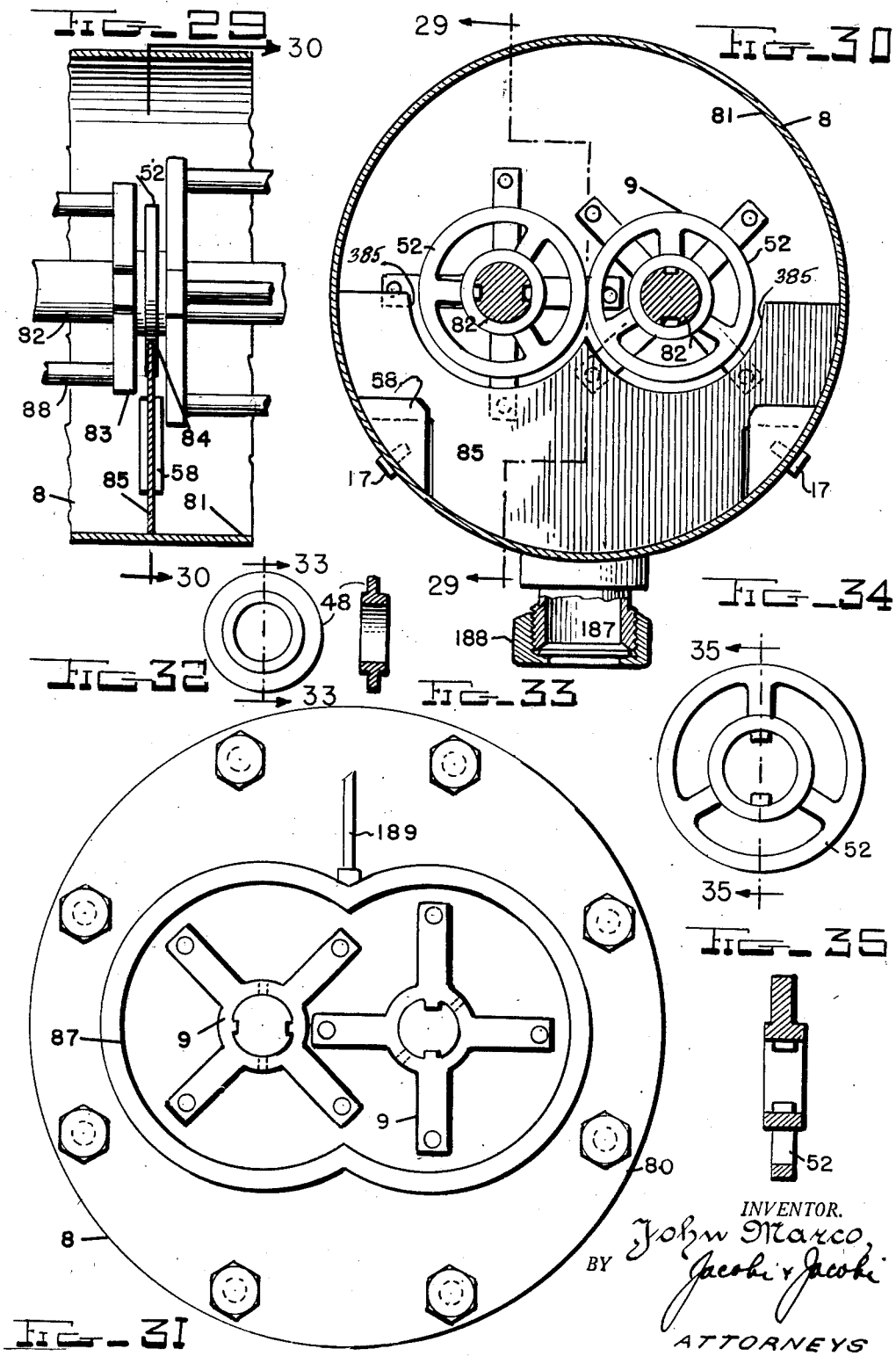

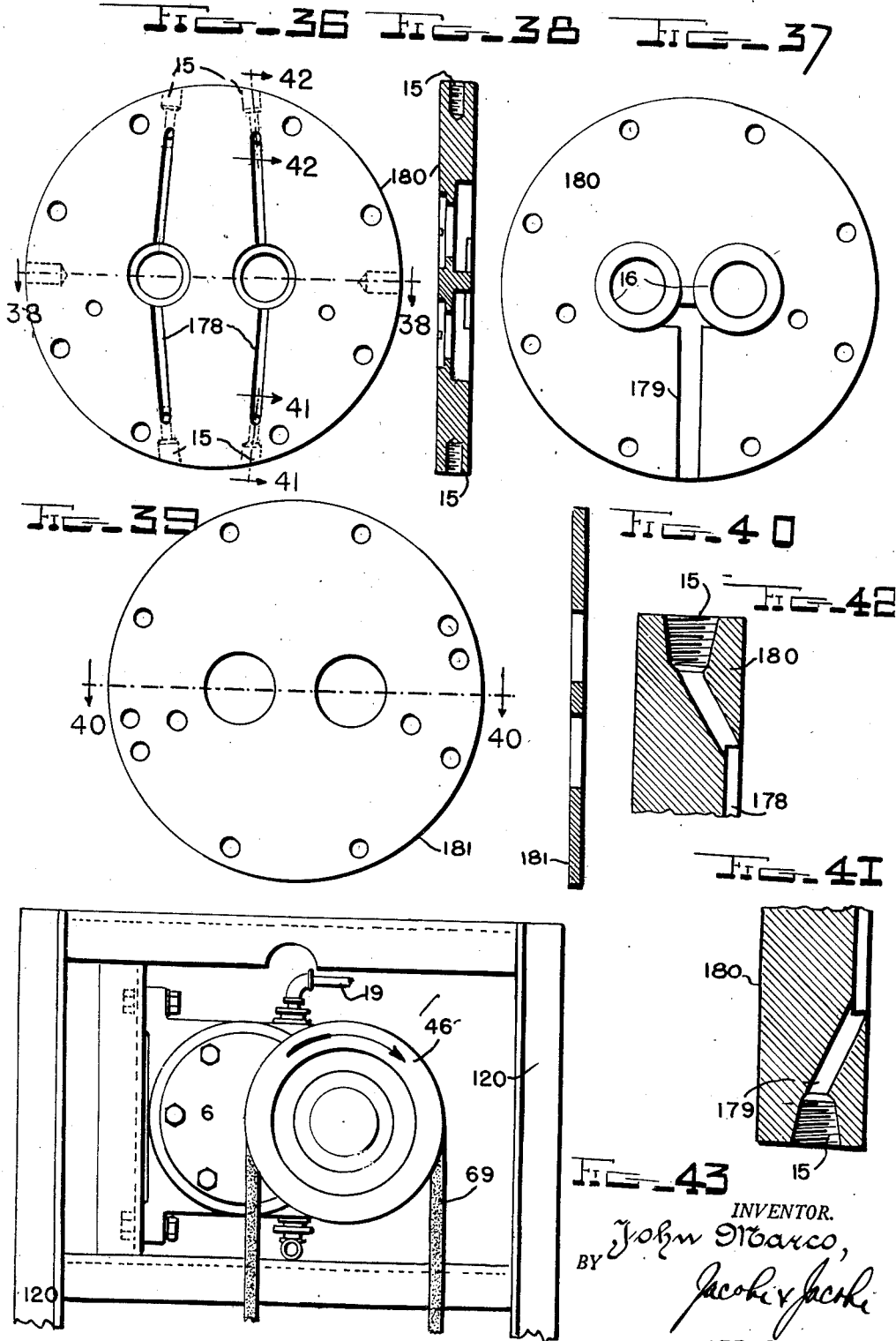

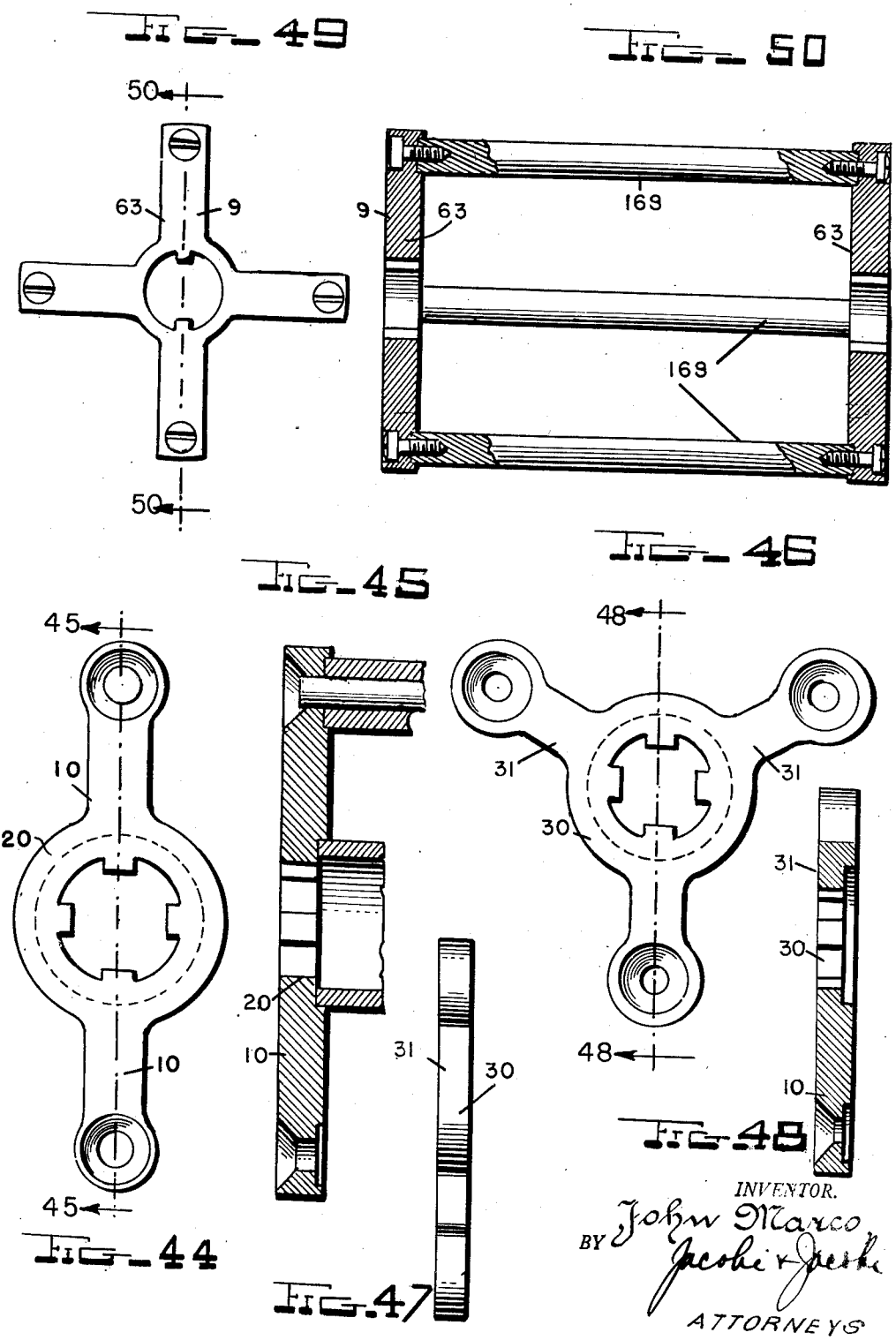

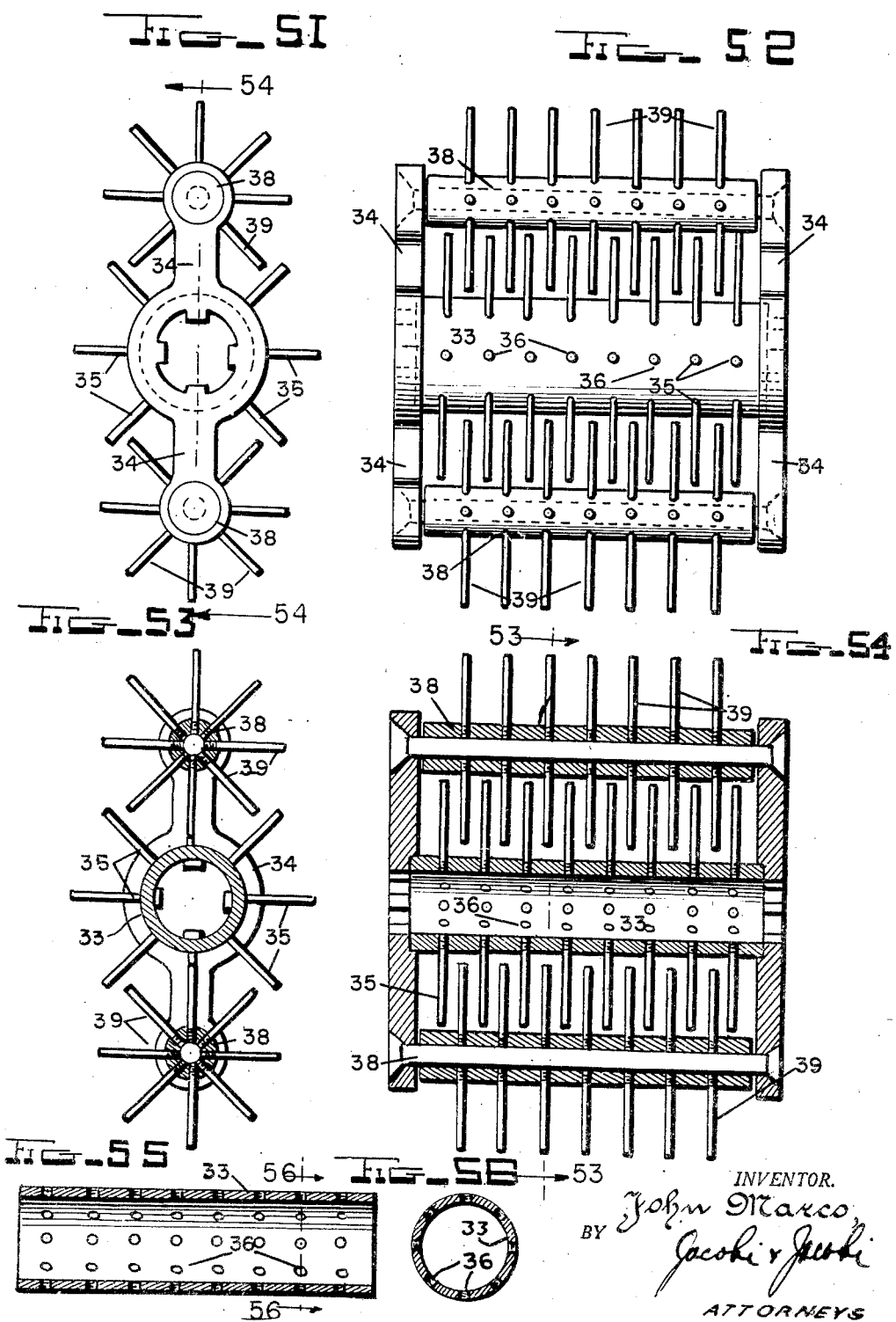

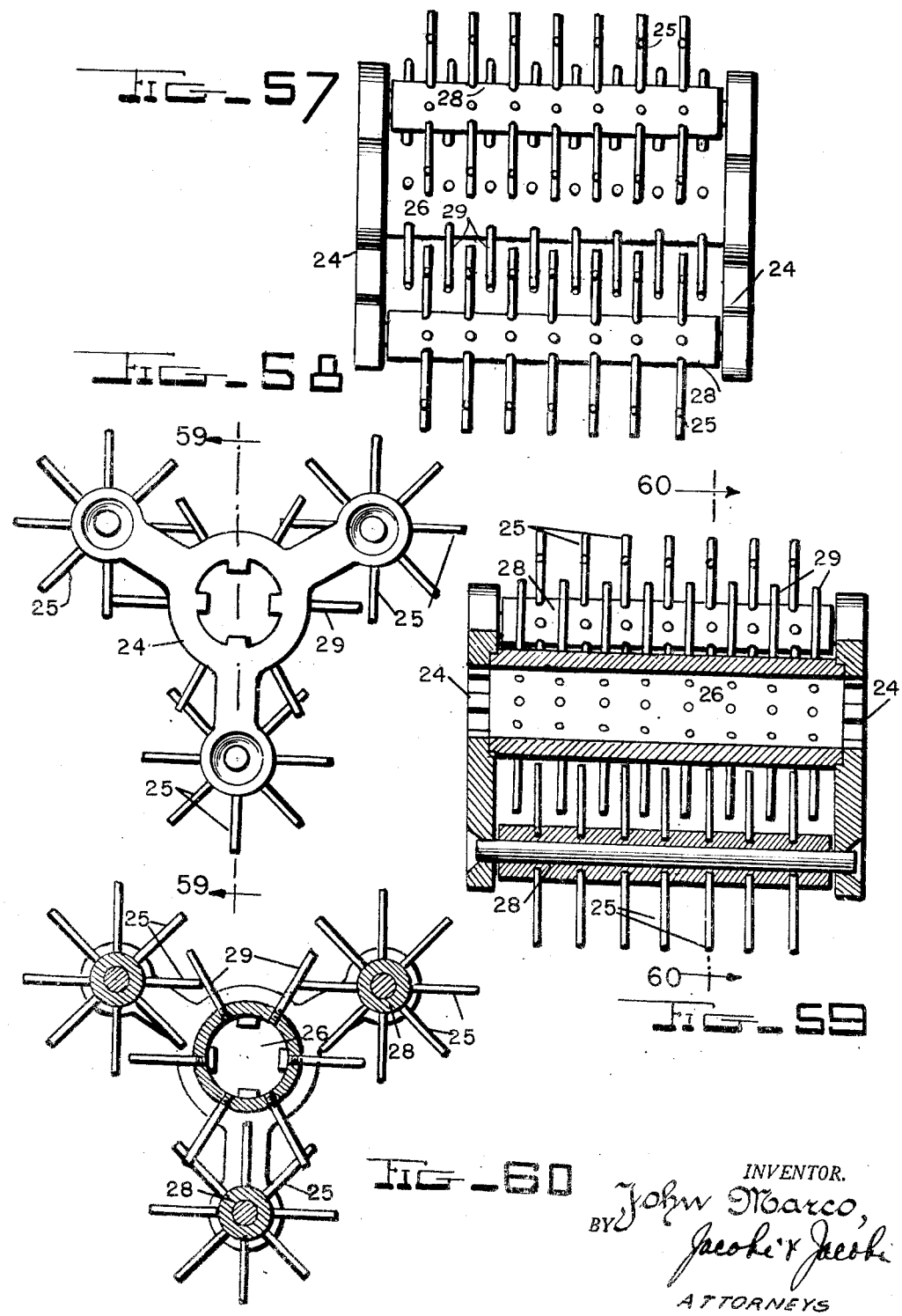

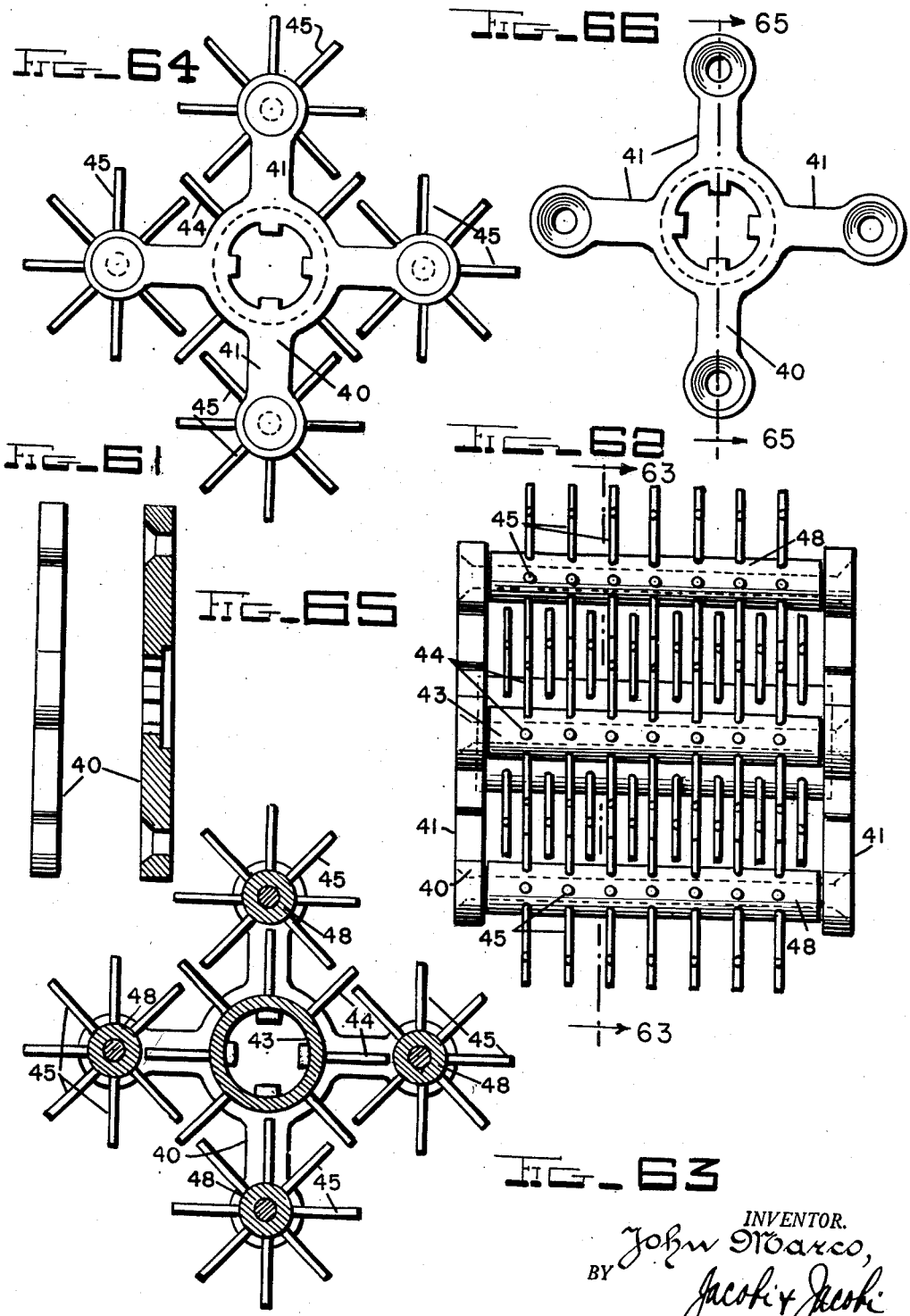

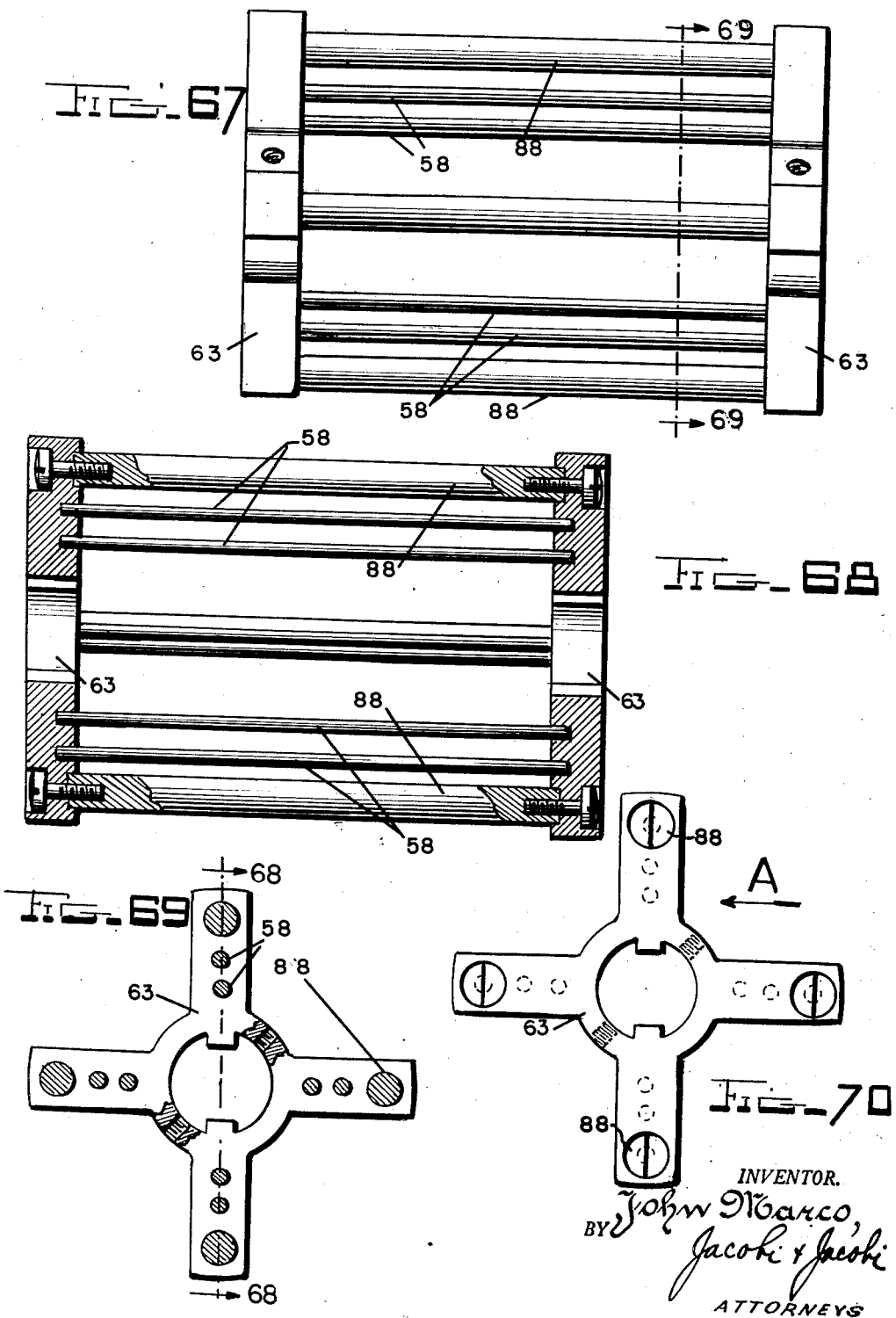

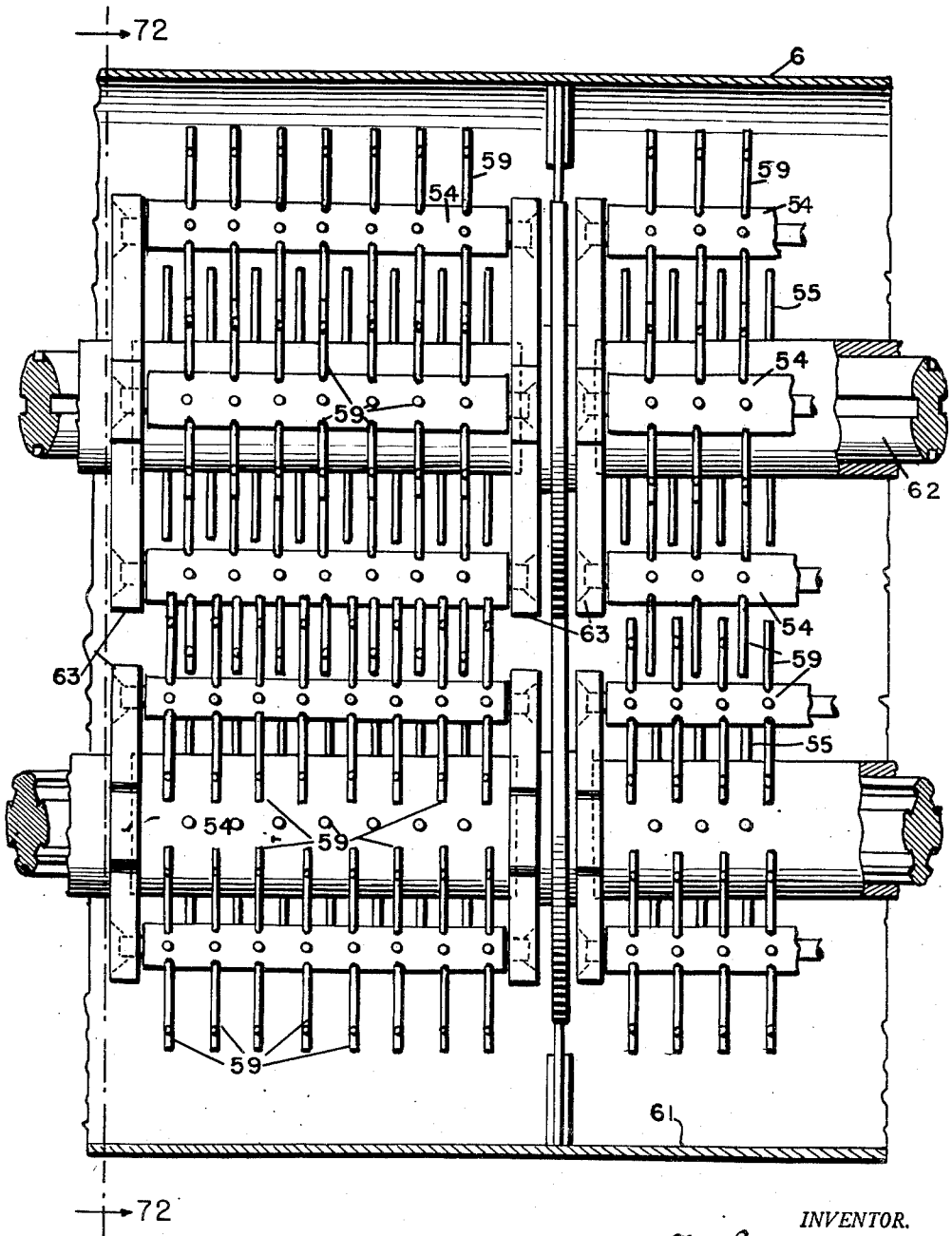

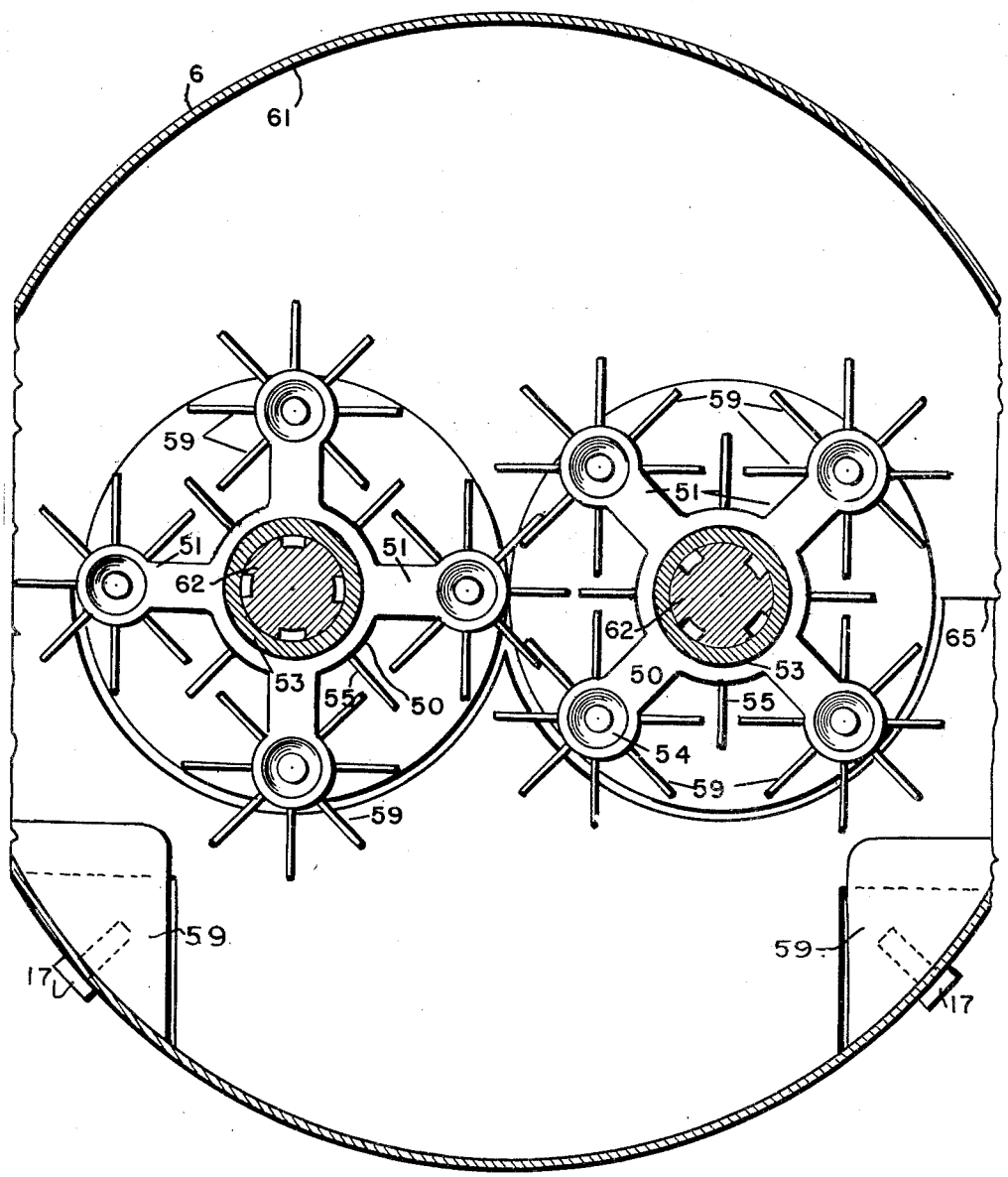

Patented Sept. 1, 1953

2,650,804

UNITED STATES PATENT OFFICE 2,650,804

MACHINE AND PROCESS FOR PRODUCING LATEX FOAM CONTINUOUSLY

John Marco, Wilmington, Del., assignor to Marco Company, Inc., Wilmington, Del., a corporation of Pennsylvania Application September 13, 1950, Serial No. 184,627

17 Claims. (Cl. 259—6)

This invention relates to equipment and processes for the production of latex foam. It is based on similar principles and structure to that embodied in my Patent No. 2,321,609. However, the differences will be indicated as the specification herein discloses the features that it includes.

An object of this invention is to provide a new and improved assembly of components in a unit that will produce latex foam ready for delivery as a raw product for such further processing as may be desired.

Another object of the invention is to provide a new and improved assembly of components that will produce latex foam continuously.

A further object of the invention is to provide a new and improved assembly of components for the production of latex foam that will be equipped to mix the ingredients involved in a most intimate degree and thereby make a predetermined product of a most suitable nature, expeditiously, effectively and efficiently.

A still further object of this invention is to provide a new and improved machine for the treatment of latex to produce latex foam, that will do the work automatically, will make the product uniform, will have complete control of its processing and which will enable changes and adjustments to be made in its operational functions while it is running and without interruption to its operation.

A still further object of the invention is to provide a new and improved latex foam making machine that will be compact in size for the amount of production it is capable of, and designed for economical manufacture and operation.

With these and numerous other objects in view, my invention consists in the novel features of construction, combination and arrangement of parts, as will be hereinafter and more particularly set forth in the specification and claims.

For a better understanding of the invention, its objects, principles involved, and operation, reference is made to the accompanying drawings. These drawings, together with the following explanation of their details, form an illustration of the invention, by way of example, while the claims indicate the scope thereof.

Referring to the drawings:

Figure 1 is an end elevation of a machine assembly embodying this invention, for the manufacture of latex foam;

Figure 2 is an end elevation opposite to that of Figure 1;

Figure 3 is a side elevation of the machine;

Figure 4 is a plan view of Figure 1;

Figure 5 is a sectional view, partly in elevation, through the intermingling chambers of this embodiment; taken to show the construction close to the paddles;

Figure 6 is a sectional view taken longitudinally substantially through the secondary chamber to show a view of its mechanism, as seen on line 6—6 of Figure 4;

Figure 7 is a detail elevational view of one of the seal partitions used in the chamber shown in Figure 6;

Figure 8 is a similar view to Figure 7 taken from the opposite side of the seal.

Figure 9 is a vertical sectional view therethrough as seen on line 9—9 of Figure 7;

Figure 10 is a partial sectional view through the casing of the secondary chamber showing the paddles in full lines, taken on line 10—10 of Figure 5;

Figure 11 is a vertical sectional view taken transversely on line 11—11 of Figure 10;

Figure 12 is a detail elevational view of the seal separating plate used in Figure 10;

Figure 13 is a similar view of the plate shown in Figure 12, taken from the opposite side;

Figure 14 is a sectional view, therethrough, taken on line 14—14 of Figure 12;

Figure 15 is a sectional view of the secondary chamber taken at right angles to Figure 10 and showing by arrows the diagrammatic flow of the latex being worked in this chamber;

Figure 16 is a plan view of the chamber indicated in Figure 15;

Figure 17 is a longitudinal sectional view of the secondary chamber as seen on line 17—17 of Figure 18;

Figure 18 is a detail plan view of the secondary chamber.

Figure 19 is an enlarged fragmentary detail section of the secondary chamber;

Figure 20 is a transverse sectional view therethrough as seen on line 20—20 of Figure 19;

Figure 21 is a sectional view, as seen on line 21—21 of Figure 20;

Figure 22 and Figure 23 are face views of the stationary baffle plates used in the secondary chamber;

Figure 24 is a detail elevation of the baffle plate holder;

Figure 25 is an end view of Figure 24;

Figure 26 is a sectional detail of the gears and housing as seen on line 26—26 of Figure 15;

Figure 27 is an end elevational detail of the secondary chamber as seen on line 27—27 of Figure 5;

Figure 28 is an enlarged detail of the drive used on the secondary chamber;

Figure 29 is a fragmentary detail section taken on line 29—29 of Figure 30;

Figure 30 is an enlarged sectional detail of the secondary chamber as seen on line 30—30 of Figure 29;

Figure 31 is an end elevational detail at the discharge end of the secondary chamber;

Figure 32 is a face detail of a collar used at the baffle plate in the secondary chamber;

Figure 33 is a sectional view of Figure 32 taken on line 33—33;

Figure 34 is a detail elevation of an antichattering wheel used in the chamber;

Figure 35 is a sectional view of Figure 34 taken on line 35—35;

Figure 36 is a front face detail of the cooling plate, used in the chamber;

Figure 37 is a rear face view of Figure 36;

Figure 38 is a section on line 38—38 of Figure 36;

Figure 39 is a detail face view of the seal and spacing plate;

Figure 40 is a section on line 40—40 of Figure 39;

Figure 41 is a sectional detail as seen on line 41—41 of Figure 36;

Figure 42 is a sectional detail as seen on line 42—42 of Figure 36;

Figure 43 is a fragmentary detail of the drive used with the primary chamber;

Figure 44 is a detail of a modified form of spider used for the blades, and intended for dual blade structures;

Figure 45 is a sectional view as seen on line 45—45 of Figure 44;

Figure 46 is a detail of a modified stationary spider for triple blade structure;

Figure 47 is an end view of the spider shown in Figure 46;

Figure 48 is a section taken on line 48—48 of Figure 46;

Figure 49 is a four blade spider detail;

Figure 50 is a four blade spider in section taken on line 50—50 of Figure 49;

Figure 51 is an end elevation of a modified blade arrangement;

Figure 52 is a side view of Figure 51;

Figure 53 is a section taken on line 53—53 of Figure 54;

Figure 54 is a section taken on line 54—54 of Figure 51;

Figure 55 is a sectional detail of the sleeve used for holding the spikes of the blades;

Figure 56 is a section taken on line 56—56 of Figure 55;

Figure 57 is a side elevational detail of a modified triple-bladed form having rotatable spiders;

Figure 58 is an end elevation of Figure 57;

Figure 59 is a section taken on line 59—59 of Figure 58;

Figure 60 is a section taken on line 60—60 of Figure 59;

Figure 61 is an end elevation of a support or spider for a rotary quadruple form of blade structure;

Figure 62 is a side elevation of a quadruple form of rotary blade structure;

Figure 63 is a sectional elevation taken on line 63—63 of Figure 62;

Figure 64 is an end elevation of the quadruple spider and blade structure;

Figure 65 is a section taken on line 65—65 of Figure 66;

Figure 66 is a side elevation of the spider shown in Figure 61;

Figure 67 is a side elevation of another modified form in elevation having a rotary four spider structure including non-rotatable beaters;

Figure 68 is a section partly in elevation taken on line 68—68 of Figure 69;

Figure 69 is a section taken on line 69—69 of Figure 67;

Figure 70 is an end elevation of this structure;

Figure 71 is a fragmentary section through a chamber showing in elevation another form of blade structure;

Figure 72 is a section taken on line 72—72 of Figure 71, and

Figure 73 is a detail of the indicators used on the piping of the embodiment.

Similar reference characters refer to similar parts throughout the drawings.

In the form of the invention indicated herein, the apparatus provides for the production of commercially accepted latex foam in variable densities and is accomplished by continuous flow. It produces the product in a state of controlled uniformity, which is not feasible in other known conventional processes. The gelling compound involved in the process is metered in percentage to conform with the flow rate employed within its gelling cycle. This avoids the conventional batch method where one batch is added to another during the process, either in molds, conveyor belts or otherwise. The process meters the accelerator into the latex foam mixture in percentages intended to best suit the final product or compounds derived and is predetermined synchronous with the continuous flow. The proper ratio of air is metered into the mixture as processed in such a manner as to enable the density to be predetermined. Thus, it is feasible to set a given flow rate of solids to air that are being processed through the foam generating chambers.

Provision is also made to maintain the apparatus at the desired temperature or vary it as the occasion may require. The impellers, blades and paddles, employed to manipulate the ingredients in the mixture enable inner folding to be accomplished which results in higher elasticity in the final product, due to the state of homogeneity derived in the mixed components, and the degree of lamellar wall or film uniformity and the amount of the air cells in the material.

With this apparatus, and including the reactor described in my patent application Serial Number 91,202, filed May 3, 1949, now Patent No. 2,538,466, it is possible to pre-treat the compounded latexes with additives, such as clay, etc., to effect an improved colloidal suspension. This results in a thorough wetting of all surfaces and the breaking up of any aggregates or agglomerates that are in the additives, and produces a uniform dispersion and suspension. As this manipulation takes place in a pressure chamber, arrangements at the inlet of the latter are made to meter air into the latex compound to produce microscopic air cells entrapped therein and pass through the foam generator; an accurately controlled density results. The desired results occur even though as much as 50% solids by weight are added to the latex compound prior to foaming.

With the homogenizer valve, the compounded latex can be further treated by adding all of the accelerator and compounds at pressures varying from 1 lb. to 750 p. s. i., resulting in effectively controlled foaming stability.

Thus in the cae of neoprene, natural rubber, etc., curing in the conventional manner is unnecessary and in its place foam in its wet and ungelled state can be fed immediately into the curing ovens. In the case of open atmospheric curing the surface checks or cracks are minimized and in molded products shrinkage is greatly reduced.

By the proper selection of metallic ingredients, electrolysis and other electrical actions are reduced to a minimum, making possible the continuous whipping in the foaming chambers, yet causing little or no balling or coagulation of the latex on the impellers and other moving or stationary members in the chambers. The apparatus is designed to provide a continuous flow of latex or foam material in the form of a flat endless belt or mold that can be synchronized with a conveyor carrying same to continuous curing ovens. The gyroplane impellers employed in this invention enable foaming to be accomplished through the use of a step method. Beginning first with a dual gyroplane, then following with a triple gyroplane, then with the quadruple gyroplane and so on. Thus, the process of foaming can be carried on with gradually increased rapidity.

It will be noted in the structure shown in the drawings, that the apparatus includes a list of the main component parts as follows:

| Name of Part | Purpose | Reference Character |
| --- | --- | --- |
| Supply Tank | For raw ingredients | 1 |
| Air Metering Device | Control of air feed | 2 |
| Solids Valve | Control of solids feed | 3 |
| Mixing Pump | To force mixed ingredients into chambers | 4 |
| Feed Piping | To carry latex mixture to primary chamber 6 | 5 |
| Primary Foam Mixing Chamber | To mix and manipulate latex, air | 6 |
| Interconnection | To connect chambers | 7 |
| Auxiliary Foam Chamber | To remix ingredients and additives | 8 |
| Stirring Propellers | To stir and mix ingredients | 9 |
| Accelerator Metering Pump | To introduce accelerators | 100 |
| Gelling Compound Metering Pump | To introduce gelling ingredients | 110 |
| Supporting Frame | To unitize components | 120 |
| Solids Air Valve | To control air and latex mix | 130 |

To identify the functions of the components in the brief descriptions of the figures more fully, the following details are added:

Figure 1 has the items in the previous paragraph in assembly.

Figure 73: The solids air valve, designated 2 and 3, is described in detail in my copending patent application, Serial No. 91,203, filed May 3, 1949, to which reference is made for a full description thereof. Since the specific details of this valve form no part of the instant invention further description thereof appears unnecessary.

Figure 2 illustrates in the assembly, a preferred form of transmission arranged, as seen from the rear of the machine for rotating the propellers 9 from the main motor 121, and changer 122.

Figure 3 shows the feed lines 189, from the accelerator metering pump 100 to the auxiliary latex chamber 8 as well as that from the gelling compound metering pump 110, the latter entering the discharge funnel 87 and causing mixture with the ejected latex air foam product. The pumps 100, and 110, are respectively driven by motor 102, through speed changer 103, the motor 112, through speed changer 113, in a conventional direct connected manner.

Figure 5 is a partial section of the two chambers, showing through the medium of arrows, how the latex ingredients are moved therethrough, directionally and longitudinally. It is, of course, understood that the propellers 9, twirl the material circumferentially at the same time. The baffles 65 and 85, closing off the lower half of the chambers, facilitate this action.

Figure 6 is a further section, particularly directed to the structure of the auxiliary chamber 8, and especially to the seal plates. The latter are further illustrated in Figures 7, 8, and 9.

Figure 10 particularly indicates details of the primary chamber 6, with the seal plates of this chamber in section and including the cooling arrangements, the latter being detailed in Figures 12, 13, 14.

Figure 15 shows the course of the latex ingredients during compounding and as the same is kneaded through the primary chamber 6.

Figure 17 is a sectional detail of the auxiliary chamber 8. The coolant piping connections to the plates 180, 181, are shown. Details of plate 180 are shown in Figures 36, 37, 38, 42, 43 and those of plate 181 in Figures 39, 40.

Figure 19 is a longitudinal sectional detail of a small section of the auxiliary chamber 8, to particularly clarify the manner of assembly of the baffles 65, spaces 48 and 52, and baffles 85. The baffles are detailed in Figures 22, 23.

Figure 20 is a transverse sectional view through the auxiliary chamber showing the relative positions of the baffles 85 and propellers 9. The baffles are detailed in Figures 22, 23.

Figures 24, 25 detail the lugs 58, supporting the baffles in their vertical slots 18 and held by the bolts 17 to the wall of the cylinder 81.

Figure 26 shows the driving gears 68 in the primary chamber 6 for synchronizing their rotation, but in opposite direction. Similar gears 185 are employed in the auxiliary chamber 8.

Figure 27 shows the discharge end of the auxiliary chamber 8, from which the product is ejected.

Figures 29, 30 show the misalignment of the propeller blades, as well as a baffle plate assembly in the auxiliary chamber. This is to intermingle the latex more effectively.

Figures 36, 37, 38, 39, 40, 41 show the detailed structure of the coolant or seal plates with the bleeder grooves 179, 178 incorporated on them to permit the circulation of coolant therethrough. These plates are necessarily kept cool to use up heat developed in the cylinders by the mixing and churning of the latex materials, so the latter will not tend to cure or vulcanize ahead of time. The materials are fluid in form, and used at ordinary temperatures in the chambers, but the energetic churning tends to create considerable heat, which necessarily must be dissipated. The coolant circulation in the seal plates takes care of this. If, however, it proves insufficient, increased cooling arrangements may be incorporated in the structures of the cylinders.

The remaining figures deal principally with modified forms of the propeller construction and are discussed later in the description. The use of the terms, propellers, impellers, paddles, etc., to the stirring or agitating mechanisms in the cylinders is intended to be generic, rather than directed to a particular defining member by a particular name. It is deemed unnecessary herein to limit the meaning of such to the usual limits of such terms. The terminations 15, of the grooves 178, 179 in the seal plates are screw threaded to enable the coolant piping to be connected thereto in a conventional manner. The bearings for the shafts 62, 82, are cooled to prevent overheating. Lugs 59 support the baffles in the primary cylinder.

The supply tank 1 is of conventional form with a tapered bottom to guide the latex ingredients effectively to a feed pipe 13, which connects with the solids valve 3 and thence to the mixing pump 4. The air and latex ingredients are mixed and forced through the pipe 5 into the primary foam mixing chamber 6.

The mixing pump 4 is of a structure such as shown in my Patent No. 2,321,609, dated June 15, 1943, and the valve 3 is of a type such as shown in my aforementioned copending application Serial No. 91,203.

The air metering control device 2 is provided with a gauge and control as indicated and can be of the Victro type which is conventionally used for the purpose in question. The component 3 is used to meter the solids and is mounted in association with the connection 130 to control the inflow of air and ingredients to the mixing pump 4.

Primary chamber

The primary foam mixing chamber 6 consists of a hollow cylinder 61, which has four dual sets of propellers 9, which rotate synchronously with one another and are mounted on longitudinal shafts 62 inserted in and keyed to four spoked spiders 63, which are operated thereby. The shafts 62 are supported on bearings 64, installed in semi-disc-like baffles 65 secured rigidly to the lower half of the interior peripheral surface of the cylinder 61. The baffles are stationary and spaced to prevent the latex compound from readily flowing past them. The compound, however, will take a path longitudinally through the cylinder, as indicated by arrows in Figures 5, 10 and 15. This is primarily due to the fact that the compound is under pressure from the pump 4, as it is forced through the inlet 66, into the chamber 6, and through the outlet 67. The shafts 62 are revolved together by having gears 68 mounted on them and meshed together to be operated by a transmission 69 extraneously connected thereto and driven by a motor 121 mounted on the frame 120. The cylinder 61 is capped at one end by a manhole cover 60, while the opposite end serves as a stuffing base and with a hollow plate 160 for cooling. The coolant is piped to this plate 160 and circulates through it to a pipe connected with a cooling system. An auxiliary plate 161 is mounted adjacent to the plate 160, and is recessed to allow a coolant and solvent (ammonia, or the like) to circulate therethrough from another extraneous cooling system.

A cover plate 162 is attached and supports an extension sleeve 163 thereon. The extension sleeve 163 is preferably constructed as shown in Figure 15, and has bearings 164 to support the shafts 62 with the gearing 68 enclosed in a housing 165 thereon and serving as an auxiliary drive. The hand holes 167 with removable caps 168 enable the sections partitioned between the baffles to be conveniently cleansed. The propeller sets are arranged in dual alignment with each other longitudinally and with the blades or bars 169 of each propeller disposed 90° out of alignment with its neighboring propellers. See Figs. 27, 49 and 50. This is to promote an effective entangling contact with the latex compound in the chamber.

This primary chamber is intended to promote a primary mixing action on the compound in the chamber and give it a rough beating action. It may be noted that the transmission 69 is coupled off center for this chamber. A spacer 48 is used in the baffles 65 to separate the sections of the propeller. The plates 160, 161 are grooved to facilitate circulation of the cooling water over their surfaces. Provision is also made to reduce undesirable vibration in the propellers.

The collar 106 fitted on the cylinder 61 is drilled and threaded to receive the bolts holding the cover 60 thereto. The piping 19 supplies cold water to the outboard bearings 64. The reinforced holes 16 in the sealing plate 160 enable the shafts 62 to pass freely therethrough and the integral peripheral ring 26 strengthens the plate. Collar 11 is arranged on the cylinder 61, to engage the seal plate 160. The transmission 69 drives the pulleys 269 on the shafts 62, from the motor pulley 289. The pump 110 is supplied from a tank 111 and the pump 100 is supplied from the tank 101.

Secondary chamber

The secondary or auxiliary chamber provides for continuing the entangling and mixing of the latex material as it is forced through it from its inlet 86 to its open discharge opening 87 at its rear end. The flow of the compound follows the path shown by arrows in Figure 5, as promoted by the baffles 85. The discharge end consists of an open cylindrical funnel bolted at 80 to the cylinder 81. Handholes 187, with caps 188 serve as cleanouts on the bottom of the wall of the cylinder. The front end of the cylinder 81 is arranged similarly to the cylinder 61. It has the cooling plate 180, with circulating piping formed therein for water circulation, and an auxiliary plate 181 for ammonia cooling. The chamber 8 has dual propellers arranged in quintuple sections separated by the baffles 85, said propellers having bars or blades 88, consecutively 90° out of alignment with adjacent propeller blades 88. It also has transmission 89 and gear shafts 82, spiders 83, and bearings 84, similar in general to those in the primary chamber. It also includes a cover plate 182, extension sleeve 183, bearings 184, gears 185, housing 186, handholes 187, and handhole caps 188. In addition it has the chemical piping 189 connected to the top of the cylinder 81 for adding special ingredients. This chamber also has piping, not shown, connected to its outboard bearings to cool them with water from an extraneous cooling system. The handles 22 are employed for adjusting the plates 181 to which they are attached. The plates 180, 181 are grooved to facilitate the circulation of the cooling mediums. Provision to reduce or prevent vibration on the propellers during rotation is included in each chamber. Lugs 58 for supporting the baffles in place are fastened by bolts to the walls of the cylinders.

Incidental components

The accelerator ingredient pump 100 is supplied from a tank 101, and operated by the pump motor 102 with its speed changer 103. Likewise gelling compound pump 110 has a speed changer 113 and a supply tank 111. The reinforced holes 16, as shown in Figure 37, are designed to permit the shafts 62 to pass therethrough. The bolts 17, as shown in Figure 20, hold the lugs 58 to the secondary cylinder wall 81 of the chamber 8, in the same manner as the lugs 59 are held to the primary cylinder wall 61.

Referring to Figs. 52 and 53, the central sleeve 33 holds the spokes 35 in the holes 36 stationary while the bars 38 with their spokes 39 are free to rotate on the spider 34.

The inlet 86 leads into the secondary chamber 8, and is connected with the outlet 67 of the chamber 6, as shown in Figure 5. The primary chamber 6 has handholes 167, with caps 168 for cleaning purposes.

In Figures 29, 30, 34, 35, non-chattering wheels 52 are mounted on the shafts 82 as indicated. They brace or peripherally contact each other to take up the play between them. They are located in the particular baffle plates 85 which have large recesses 385, to permit them to rotate freely therein. The other baffle plates 85 do not have the wheels 52 but instead have the spacers 48. The recesses 283 are made smaller in proportion to take the shafts 82. The baffle plates 65 used in the primary cylinder 6 are similar. These non-chatter wheels are very desirable because the rotation of the propellers in the latex tends to cause considerable vibration, which this arrangement prevents. The pulley 289 drives the transmission 89.

As a matter of information, the accelerator may consist of any accepted form of colloidally dispersed solids such as sulphur, zinc-oxide, etc., and the gelling ingredients of colloidally dispersed solids in a liquid medium, such as sodium silica fluoride, ammonium sulphate, ammonium nitrate, and similarly applicable compounds.

Operation

Briefly, the operation of the machine, consists in running the pumps, and propellers, and feeding the ingredients as they are needed. During this operation, the propellers rotate, and mingle the latex compound indiscriminately and yet with predetermined uniformity to produce a maximum amount of mixing and intermingling. The control of the feed of ingredients and air into the system while important in this invention has been outlined in the copending application referred to previously. It is therefore deemed unnecessary to repeat their specific operation.

Modifications

While the blades or bars used on the propellers 9, in the foam making chambers are effective, their specific structure included in the propellers shown in the assembled units indicated in Figures 1 to 35, inclusive, does not meet all conditions. These conditions vary with the mixtures, ingredients, temperature, rate of beating and other manufacturing, chemical and physical incidentals. To meet other conditions, the following modified forms are briefly referred to.

In Figure 44, the modified propeller spider 20 employs only a pair of arms 10, to hold the blades used in either chamber. The arms 10 are located in the same plane, 180° apart. This form is particularly suited for heavy mixes and is used with a single operating shaft, whereas the spiders previously described in the assembled unit shown in Figure 1, et seq., utilize four arms or shafts.

In Figure 46, there is shown a triple-armed spider 30, with the arms 31, spaced substantially 120° apart. This has a very effective action and is not so prone to vibration as the form shown in Figure 44. It employs a single central shaft for rotating it.

In Figs. 49 and 50 there is shown a propeller formed by spiders 63 having four arms 9 spaced substantially 90° apart. These arms 9 in the spaced spiders 63 are connected by propeller bars 169.

In Figures 51, 52, 53, 54, the propellers employ single two arm spiders to hold the blades, and the spider revolves bodily, its central axis being stationary central sleeves 33, from which project the radial spokes 35 mounted in openings 36. The arms 34 of the spiders are 180° apart and at their terminals are mounted journal bars 38 which rotate therein and carry spokes 39 spaced 45° apart and similar to spokes 35. These spokes take the place of the blades or bars in the original form described hereabove. The sleeve 33 and spokes revolve bodily, while the terminal bars 38 revolve loosely in the spider arms. The spokes of each element are disposed out of alignment so that the various elements may rotate independently without conflict one with the other.

In Figures 57, 58, 59 there are shown triple arm spiders 24, central sleeves 26 with spokes 29, loosely rotatable bars 28 with spokes 25, similar to the previously described form, except that the arms are located 120° apart.

Figures 61, 62, 63, 64, 65 illustrate a quadruple spider 40 with four arms 41, and a central sleeve 43, with spokes 44. The arms 41 carry loosely rotatable bars 48 provided with radial spokes 45. The arms are 90° apart. The general action of the propellers is like the form last referred to.

Figures 67, 68, 69, 70 indicate a form of propeller like that originally described. It includes in addition blades 58 crossing the spiders but in radial alignment with the original blades 88 whereby more paddling surfaces will be provided to engage the latex during its intermingling processing. It operates like the forms previously described.

Figures 71 and 72 show a dual arrangement of propellers, horizontally aligned with each other in the chambers. The spiders 50 are like those previously described in connection with Figures 63 and 64, with a central sleeve 53, spokes 55, with quadruple arms 51, disposed 90° apart. The arms 51 support the bars 54, which have the radial spokes projecting therefrom, said bars being loosely mounted for rotation between the arms. In this form of the invention shafts 62 revolve in opposite directions.

The propeller action in all instances will carve depressions in the fluid latex and open it so that same will be accessible to air (or gas) in the chamber. Then an instant later it will close such space and entrap the air so it will intimately mix therein. The continuous movement of the propellers, together with the enforced flow of the latex compound, produces many such actions and in various directions, so that the resultant product will be embedded throughout with multitudinous and microscopic cells of air. The particular spoked propellers hereabove described tend to increase such air intimacy. The tearing and pulling of the latex has a kneading effect which is particularly desirable in rubber and quasi-rubber ingredients, and serves to increase its useful qualities and strength. This structure also enables the latex compound to be processed continuously and uniformly.

While the invention has been substantially amplified, it is not intended that this application for patent should be limited to the structures illustrated, as it is appreciated that other forms of the invention could be developed and used that would employ the same principles and come within the scope of the appended claims.

Having thus described the invention what is claimed is:

1. A latex foam generator comprising in combination, a frame, a plurality of mixing chambers on the frame for intermingling latex ingredients and air in consecutive order therein, a plurality of meshed propellers rotating in said chambers in synchronism with each other to stir the intermingled ingredients intimately and continuously, said chambers including outlets for the ejection of the mixed material therefrom, in a continuous flow, means for supplying additives to the material to promote physical and chemical actions therein in predetermined sequence and degree, said means being mounted on said frame adjacent to said chambers, and pump means on the frame for forcing the ingredients and end material from the machine in condition to be carried to another extraneous location for predetermined uses and purposes, said propellers including bar blades rotating parallel to the longitudinal axis of the chambers and held out on spiders so as to thrash through said ingredients concentrically.

2. A latex foam generator comprising in combination, a frame, a plurality of mixing chambers on the frame for intermingling latex ingredients and air in consecutive order therein, a plurality of meshed propellers rotating in said chambers in synchronism with each other to stir the intermingled ingredients intimately and continuously, said chambers including outlets for the ejection of the mixed material therefrom, in a continuous flow, means for supplying additives to the material to promote physical and chemical actions therein in predetermined sequence and degree, said means being mounted on said frame adjacent to said chambers, and pump means on the frame for forcing the ingredients and end material from the machine in condition to be carried to another extraneous location for predetermined uses and purposes, said chambers including a series of propellers having blades extending from supporting spiders spaced apart on the respective spider and from those of other propellers in the same chambers, whereby their rotation will permit unobstructing meshing and intertwining of the mixture around and about the blades, said outlets being joined by a restricted piping serving to squeeze the mixture as it passes from one chamber to another, said propellers including bar blades rotating parallel to the longitudinal axis of the chambers and held out on spiders so as to thrash through said ingredients concentrically.

3. A latex foam generator comprising in combination, a frame, a plurality of mixing chambers on the frame for intermingling latex ingredients and air in consecutive order therein, a plurality of meshed propellers rotating in said chambers in synchronism with each other to stir the intermingled ingredients intimately and continuously, said chambers including outlets for the ejection of the mixed material therefrom, in a continuous flow, means for supplying additives to the material to promote physical and chemical actions therein in predetermined sequence and degree, said means being mounted on said frame adjacent to said chambers and pump means on the frame for forcing the ingredients and end material from the machine in condition to be carried to another extraneous location for predetermined uses and purposes, said chambers including a series of propellers having blades extending from supporting spiders spaced apart on the respective spider and from those of other meshed propellers in the same chambers, whereby their rotation will permit unobstructing meshing and intertwining of the mixture around and about the blades, said propellers being disposed in different planes within their respective chambers to produce an intermingling in a plural number of directions and means for squeezing the mixture as it passes from one chamber to another, said propellers including bar blades rotating parallel to the longitudinal axis of the chambers and held out on spiders so as to thrash through said ingredients concentrically.

4. A latex foam generator comprising in combination, a frame, a plurality of mixing chambers on the frame for intermingling latex ingredients and air in consecutive order therein, a plurality of propellers rotating in said chambers in synchronism with each other to stir the intermingled ingredients intimately and continuously, said chambers including outlets for the ejection of the mixed material therefrom, in a continuous flow, means for supplying additives to the material to promote physical and chemical actions therein in predetermined sequence and degree, said means being mounted on said frame adjacent to said chambers and pump means on the frame for forcing the ingredients and end material from the machine in condition to be carried to another extraneous location for predetermined uses and purposes, said chambers including a series of propellers having blades extending from supporting spiders spaced apart on the respective spider and from those of other propellers in the same chambers, whereby their rotation will permit unobstructing meshing and intertwining of the mixture around and about the blades, said propellers being disposed in different planes within their respective chambers to produce an intermingling in a plural number of directions, said rate of flow of the material and the rotation of the propellers being under control, said outlets including piping of restricted interior cross-section to produce a mechanical change in the form of the mixture as it flows from one chamber to the next, said propellers including bar blades rotating parallel to the longitudinal axis of the chambers and held out on spiders so as to thrash through said ingredients concentrically.

5. A latex foam generator comprising in combination, a frame, a plurality of mixing chambers on the frame for intermingling latex ingredients and air in consecutive order therein, a plurality of propellers rotating in said chambers in synchronism with each other to stir the intermingled ingredients intimately and continuously, said chambers including outlets for the ejection of the mixed material therefrom, in a continuous flow, means for supplying additives to the material to promote physical and chemical actions therein in predetermined sequence and degree, said means being mounted on said frame adjacent to said chambers and pump means on the frame for forcing the ingredients and end material from the machine in condition to be carried to another extraneous location for predetermined uses and purposes, said chambers including a series of propellers having blades extending from supporting spiders spaced apart on the respective spider and from those of other propellers in the same chambers, whereby their rotation will permit unobstructing meshing and intertwining of the mixture around and about the blades and barriers in said chambers for predeterminedly varying the direction of flow of the material therein, said chambers including means for compressing the mixture as it passes between chambers, and means for controlling the temperature of the chambers and removing excessive heat therefrom and means in the chambers for directing the flow of mixture in plural directions, said propellers including bar blades rotating parallel to the longitudinal axis of the chambers and held out on spiders so as to thrash through said ingredients concentrically.

6. A latex foam generator comprising in combination, a frame, a plurality of mixing chambers on the frame for intermingling latex ingredients and air in consecutive order therein, a plurality of propellers rotating in said chambers in synchronism with each other to stir the intermingled ingredients intimately and continuously, said chambers including outlets for the ejection of the mixed material therefrom, in a continuous flow, means for supplying additives to the material to promote physical and chemical actions therein in predetermined sequence and degree, said means being mounted on said frame adjacent to said chambers and pump means on the frame for forcing the ingredients and end material from the machine in condition to be carried to another extraneous location for predetermined uses and purposes, said chambers including a series of propellers having blades extending from supporting spiders spaced apart on the respective spider and from those of other propellers in the same chambers, whereby their rotation will permit unobstructing meshing and intertwining of the mixture around and about the blades and barriers in said chambers for predeterminedly varying the direction of flow of the material therein and means mounted on the frame for driving the propellers and pumps including transmission means and controls to operate same predeterminedly, said chambers including means for compressing the mixture as it passes between chambers, and means for controlling the temperature of the chambers and removing excessive heat therefrom and means in the chambers for directing the flow of mixture in plural directions, said propellers including bar blades rotating parallel to the longitudinal axis of the chambers and held out on spiders so as to thrash through said ingredients concentrically.

7. A machine for processing comprising in combination a metering means for controlling the amount of solid ingredients passing therethrough, a metering means for controlling the amount of gaseous fluid passing therethrough, a pump for propelling and mixing said ingredients and fluid as they pass through said means, a plurality of chambers coupled to one another to receive said mixture consecutively, a plurality of propellers mounted longitudinally in the chambers and including a plurality of blades thereon rotatable on the longitudinal axis of the chambers and adapted to twirl and intermingle the mixture therein, means in the chambers for diverting the mixture through a predetermined path therethrough as it passes continuously therein, means for operating said metering means and pump, and a frame for supporting said means, pumps, and chambers, said chambers including means for compressing the mixture as it passes between chambers, and means for controlling the temperature of the chambers and removing excessive heat therefrom and means in the chambers for directing the flow of mixture in plural directions, said propellers including bar blades rotating parallel to the longitudinal axis of the chambers and held out on spiders so as to thrash through said ingredients concentrically.

8. A machine for processing comprising in combination a metering means for controlling the amount of solid ingredients passing therethrough, a metering means for controlling the amount of gaseous fluid passing therethrough, a pump for propelling and mixing said ingredients and fluid as they pass through said means, a plurality of chambers coupled to one another to receive said mixture consecutively, a plurality of propellers mounted longitudinally in the chambers, and including a plurality of blades thereon rotatable on the longitudinal axes of the chambers and adapted to twirl and intermingle the mixture therein, means in the chambers for diverting the mixture through a predetermined path therethrough as it passes continuously therein, means for operating said metering means and pump, and a frame for supporting said means, pumps and chambers, said diversion means including baffles spaced transversely across the chambers and obstructing a predetermined section thereof, said chambers including means for compressing the mixture as it passes between chambers, and means for controlling the temperature of the chambers and removing excessive heat therefrom and means in the chambers for directing the flow of mixture in plural directions, said propellers including bar blades rotating parallel to the longitudinal axis of the chambers and held out on spiders so as to thrash through said ingredients concentrically.

9. A machine for processing comprising in combination a metering means for controlling the amount of solid ingredients passing therethrough, a metering means for controlling the amount of gaseous fluid passing therethrough, a pump for propelling and mixing said ingredients and fluid as they pass through said means, a plurality of chambers coupled to one another to receive said mixture consecutively, a plurality of propellers mounted longitudinally in the chambers and including a plurality of blades thereon rotatable on the longitudinal axes of the chambers and adapted to twirl and intermingle the mixture therein, means in the chambers for diverting the mixture through a predetermined path therethrough as it passes continuously therein, means for operating said metering means and pump, and a frame for supporting said means, pumps, and chambers, said diversion means including baffles spaced transversely across the chambers and obstructing a predetermined section thereof and means for preventing said propellers from chattering mounted in the chambers and attached to the walls thereof, said chambers including means for compressing the mixture as it passes between chambers, and means for controlling the temperature of the chambers and removing excessive heat therefrom and means in the chambers for directing the flow of mixture in plural directions, said propellers including bar blades rotating parallel to the longitudinal axis of the chambers and held out on spiders so as to thrash through said ingredients concentrically.

10. A machine for processing comprising in combination a metering means for controlling the amount of solid ingredients passing therethrough, a metering means for controlling the amount of gaseous fluid passing therethrough, a pump for propelling and mixing said ingredients and fluid as they pass through said means, a plurality of chambers coupled to one another to receive said mixture consecutively, a plurality of propellers mounted longitudinally in the chambers and including a plurality of blades thereon rotatable on the longitudinal axes of the chambers and adapted to twirl and intermingle the mixture therein, means in the chambers for diverting the mixture through a predetermined path therethrough as it passes continuously therein, means for operating said metering means and pump, and a frame for supporting said means, pumps, and chambers, said diversion means including baffles spaced transversely across the chambers and obstructing a predetermined section thereof, means for preventing said propellers from chattering mounted in the chambers and attached to the walls thereof, said propellers including blade means on plural spaced arms of spiders arranged to operate in plural directions to induce a pulling and kneading of the mixture in predetermined manipulation, said chambers including means for compressing the mixture as it passes between chambers, and means for controlling the temperature of the chambers and removing excessive heat therefrom and means in the chambers for directing the flow of mixture in plural directions, said propellers including bar blades rotating parallel to the lonigtudinal axis of the chambers and held out on spiders so as to thrash through said ingredients concentrically.

11. A machine for processing comprising in combination a metering means for controlling the amount of solid ingredients passing therethrough, a metering means for controlling the amount of gaseous fluid passing therethrough, a pump for propelling and mixing said ingredients and fluid as they pass through said means, a plurality of chambers coupled to one another to receive said mixture consecutively, a plurality of propellers mounted longitudinally in the chambers and including a plurality of blades thereon rotatable on the longitudinal axes of the chambers and adapted to twirl and intermingle the mixture therein, means in the chambers for diverting the mixture through a predetermined path therethrough as it passes continuously therein, means for operating said metering means and pump, and a frame for supporting said means, pumps, and chambers, said diversion means including baffles spaced transversely across the chambers and obstructing a predetermined section thereof, means for preventing said propellers from chattering mounted in the chambers and attached to the walls thereof, said propellers including blade means on plural spaced arms of spiders arranged to operate in plural directions to induce a pulling and kneading of the mixture in predetermined manipulation, means for coupling the chambers together as aforesaid and a discharge orifice on one of the chambers for delivering the completely processed mixture, said chambers including means for compressing the mixture as it passes between chambers, and means for controlling the temperature of the chambers and removing excessive heat therefrom and means in the chambers for directing the flow of mixture in plural directions, said propellers including bar blades rotating parallel to the longitudinal axis of the chambers and held out on spiders so as to thrash through said ingredients concentrically.

12. A machine for processing comprising in combination a metering means for controlling the amount of solid ingredients passing therethrough, a metering means for controlling the amount of gaseous fluid passing therethrough, a pump for propelling and mixing said ingredients and fluid as they pass through said means, a plurality of chambers coupled to one another to receive said mixture consecutively, a plurality of propellers mounted longitudinally in the chambers and including a plurality of blades thereon rotatable on the longitudinal axes of the chambers and adapted to twirl and intermingle the mixture therein, means in the chambers for diverting the mixture through a predetermined path therethrough as it passes continuously therein, means for operating said metering means and pump, and a frame for supporting said means, pumps, and chambers, said diversion means including baffles spaced transversely across the chambers and obstructing a predetermined section thereof, means for preventing said propellers from chattering mounted in the chambers and attached to the walls thereof, said propellers including blade means on plural spaced arms of spiders arranged to operate in plural directions to induce a pulling and kneading of the mixture in predetermined manipulation, means for coupling the chambers together as aforesaid and a discharge orifice on one of the chambers for delivering the completely processed mixture, said blade means including a series of spaced spokes extending radially from sleeves and bars mounted longitudinally in the chambers on said spiders and in plural planes for processing said mixture as aforesaid, said chambers including means for compressing the mixture as it passes between chambers, and means for controlling the temperature of the chambers and removing excessive heat therefrom and means in the chambers for directing the flow of mixture in plural directions, said propellers including bar blades rotating parallel to the longitudinal axis of the chambers and held out on spiders so as to thrash through said ingredients concentrically.

13. A machine for processing comprising in combination a metering means for controlling the amount of solid ingredients passing therethrough, a metering means for controlling the amount of gaseous fluid passing therethrough, a pump for propelling and mixing said ingredients and fluid as they pass through said means, a plurality of chambers coupled to one another to receive said mixture consecutively, a plurality of propellers mounted longitudinally in the chambers and including a plurality of blades thereon rotatable on the longitudinal axes of the chambers and adapted to twirl and intermingle the mixture therein, means in the chambers for diverting the mixture through a predetermined path therethrough as it passes continuously therein, means for operating said metering means and pump, and a frame for supporting said means, pumps, and chambers, said diversion means including baffles spaced transversely across the chambers and obstructing a predetermined section thereof, means for preventing said propellers from chattering mounted in the chambers and attached to the walls thereof, said propellers including blade means on plural spaced arms of spiders arranged to operate in plural directions to induce a pulling and kneading of the mixture in predetermined manipulation, means for coupling the chambers together as aforesaid and a discharge orifice on one of the chambers for delivering the completely processed mixture, said blade means including a series of spaced spokes extending radially from sleeves and bars mounted longitudinally in the chambers on said spiders and in plural planes for processing said mixture as aforesaid, said spokes working on their respective sleeves and bars independently of each other and facilitating the movement of the mixture through the machine.

14. A latex processing machine comprising means for supplying raw fluid latex composition, under pressure, means for supplying air under pressure and including means for metering same and providing visual indication of the relative amount of air passing through, a mixing pump for mixing said composition and air together as they leave the said means, a pipe for conducting the mixture from said pump and delivering it in restricted tubular form under pressure, a primary chamber connected with said pipe and adapted to hold a predetermined quantity of the composition, meshed propellers in pairs longitudinally arranged in the chambers and arranged to engage the composition introduced therein and twist in divers directions and entangle it with the air in the chambers, means connecting the chambers together for conveying the mixture from one chamber to the next in restricted tubular form, cooling means for controlling the temperature of the chambers attached thereto, a duct leading from the last chamber encompassing the propellers thereof extending therefrom and forming the resulting product into extruded contour of predetermined form, said propellers and pressure in said chambers being arranged to force the flow of composition in a predetermined direction continuously through the chambers, means for controlling the rotation of the propellers synchronously with one another, piping for introducing additives to the composition at predetermined portions of its flow through said chambers and baffles of predetermined form to control the direction of the flow by said propellers, said propellers including bar blades rotating parallel to the longitudinal axis of the chambers and held out on spiders so as to thrash through said ingredients concentrically.

15. In a latex processing machine of the class described a mixing mechanism comprising a plurality of cylinders arranged consecutively in relation to each other to receive and pass through a mass of latex ingredients to be intimately mixed therein with a gaseous medium forced into the chambers, a plurality of spaced and meshed propellers including bar blades disposed on the radial arms of spiders, said spiders being arranged for rotation on axes parallel to the axis of the cylinders and adapted during rotation to carry said blades so as to cut concentrically through said mass in divers directions and entwine it and the medium so as to entrain the latter in continuously diminishing bubbles in the mass, as it passes through the cylinders.

16. In a latex processing machine of the class described a mixing mechanism comprising a plurality of cylinders arranged consecutively in relation to each other to receive and pass through a mass of latex ingredients to be intimately mixed therein with a gaseous medium forced into the chambers, a plurality of spaced and meshed propellers including bar blades disposed on the radial arms of spiders, said spiders being arranged for rotation on axes parallel to the axis of the cylinders and adapted during rotation to carry said blades so as to cut concentrically through said mass in divers directions and entwine it and the medium so as to entrain the latter in continuously diminishing bubbles in the mass as it passes through the cylinders, each of said cylinders having a pair of propellers arranged so that the blades of one will mesh in between those of the others without clashing but enabling the mixed mass to be carried, stretched and twisted on and between them and further entrap the medium in the mass.

17. In a latex processing machine of the class described a mixing mechanism comprising a plurality of cylinders arranged consecutively in relation to each other to receive and pass through a mass of latex ingredients to be intimately mixed therein with a gaseous medium forced into the chambers, a plurality of spaced and meshed propellers including bar blades disposed on the radial arms of spiders, said spiders being arranged for rotation on axes parallel to the axis of the cylinders and adapted during rotation to carry said blades so as to cut concentrically through said mass in divers directions and entwine it and the medium so as to entrain the latter in continuously diminishing bubbles in the mass, as it passes through the cylinders, said cylinders including a multiple series of blades on multiple propellers mounted on multiple spiders rotatably mounted on main spiders centrally disposed in relation thereto, all propellers and main spiders being rotatable simultaneously and carrying the mass stretched and entwined in multiple directions among the blades and spiders.

JOHN MARCO.

References Cited in the file of this patent
UNITED STATES PATENTS

| Number | Name | Date |
|---|---|---|
| 782,766 | Steger | Feb. 14, 1905 |
| 929,719 | Snyder | Aug. 3, 1909 |
| 1,009,802 | Sternberg | Nov. 28, 1911 |
| 1,308,904 | Hopkins et al. | July 8, 1919 |
| 1,423,853 | Hodgson | July 25, 1922 |
| 2,057,100 | Jespersen | Oct. 13, 1936 |
| 2,112,927 | Pierre et al. | Apr. 5, 1938 |
| 2,223,764 | Hughes | Dec. 3, 1940 |
| 2,324,988 | Greenup et al. | July 20, 1943 |
| 2,509,543 | Truax | May 30, 1950 |